(12) United States Patent
Mehta et al.

(10) Patent No.: US 11,929,941 B2
(45) Date of Patent: *Mar. 12, 2024

(54) METHOD AND SYSTEM FOR MANAGING A DECENTRALIZED ACCESS TO A RESOURCE IN A PEER-TO-PEER MESH OVERLAY NETWORK

(71) Applicant: ELEAR SOLUTIONS TECH PRIVATE LIMITED, Telangana (IN)

(72) Inventors: Manav Kumar Mehta, Hyderabad (IN); Narendra Kumar Agarwal, Hyderabad (IN)

(73) Assignee: Elear Solutions Tech Private Limited, Telangana (IN)

(*) Notice: Subject to any disclaimer, the term of this patent is extended or adjusted under 35 U.S.C. 154(b) by 419 days.

This patent is subject to a terminal disclaimer.

(21) Appl. No.: 17/305,842

(22) Filed: Jul. 15, 2021

(65) Prior Publication Data
US 2021/0344614 A1 Nov. 4, 2021

Related U.S. Application Data

(63) Continuation of application No. 16/838,757, filed on Apr. 2, 2020, now Pat. No. 11,102,147.

(60) Provisional application No. 62/828,003, filed on Apr. 2, 2019.

(51) Int. Cl.
*H04L 47/70* (2022.01)
*H04L 12/66* (2006.01)
*H04L 67/104* (2022.01)
*H04L 67/141* (2022.01)

(52) U.S. Cl.
CPC .............. *H04L 47/82* (2013.01); *H04L 12/66* (2013.01); *H04L 67/104* (2013.01); *H04L 67/141* (2013.01)

(58) Field of Classification Search
CPC ...... H04L 67/104; H04L 63/101; H04L 12/66
See application file for complete search history.

(56) References Cited

U.S. PATENT DOCUMENTS

| 2009/0077254 A1* | 3/2009 | Darcie ............... H04N 21/4788 709/231 |
| 2015/0304411 A1* | 10/2015 | Cheng ................. H04L 67/1061 709/203 |

* cited by examiner

*Primary Examiner* — Hitesh Patel
(74) *Attorney, Agent, or Firm* — Husch Blackwell

(57) ABSTRACT

Embodiments of the present disclosure relate to method and a system for managing a decentralized access to a resource. A user of a client device having a third-party application installed therein request to join the mesh network based on invite received from the owner of the IoT gateway. The mesh network comprises one or more IoT gateway. One gateway is identified based on the topology of the client device, and an optimal connection between the client device and the identified gateway is determined. The third-party application may send a resource access request for accessing a resource of the mesh network and access the requested resource through the optimal connection route thus determined. Thus, the disclosure enables a peer-to-peer mesh network infrastructure that allows secure access to the resource by a third-party application without using a cloud server to route the resource access request from the client device to the gateway.

17 Claims, 16 Drawing Sheets

METHOD AND SYSTEM FOR MANAGING A DECENTRALIZED ACCESS TO A RESOURCE IN A PEER-TO-PEER MESH OVERLAY NETWORK

CROSS-REFERENCE TO RELATED APPLICATION

The present application is a Continuation of U.S. patent application Ser. No. 16/838,757, filed on Apr. 2, 2020, which claims priority to U.S. Provisional Patent Application No. 62/828,003, filed on Apr. 2, 2019, the entireties of which are incorporated herein by reference.

FIELD OF THE DISCLOSURE

The present subject matter is related, in general to field of network access of device data and control, and more particularly, but not exclusively to a method and a system for managing access to a resource in a decentralized, secure, peer-to-peer IP based mesh overlay network, to enable consumer data privacy in the upcoming "Internet of Everything" (IoE) world.

BACKGROUND

With the advent of the $5^{th}$ Generation of Cellular Connectivity (5G), the world is transitioning from an Internet of Things (IoT) world to an "Internet of Everything" (IoE) world. A world where Devices, Apps and Services are interconnected into a unified and interoperable fabric of networked communication. Low Latency is a mission critical requirement for 5G IoE applications encompassing connected cars, smart homes, drones, consumer wearable devices, virtual reality, augmented reality and industrial devices. Consumers of such systems will see vast amounts of their life getting digitized by this next digital revolution. The simplest of systems, like a diabetic monitor, to extremely complex systems, like an automotive, are transforming into digital platforms that generate vast amounts of insightful consumer data.

Today, to create such a unified and interoperable fabric of communication, IoT system architectures rely on the centralized cloud as the core platform enabler and aggregator of data. "Cloud first" IoT architectures depend on sensors for streaming data to digital twins in the cloud for data aggregation, running rules, making inferences and acting upon the inferences. But given their centralized nature of hoarding data in one place, cloud first architectures are prone to data breaches and privacy concerns. Such cloud-first platforms are additionally unable to provide low latency due to lack of Quality of Service (QoS) on the core internet network adding to an un-predictable round-trip time. Additionally, the cost of bandwidth related to ingress and egress of sending all the data to the cloud is not very scalable for solving use cases at a lower on-going economic cost. And finally, a major vulnerability in cloud first architectures is that if the cloud goes down, the entire IoE network goes down with it. This implies the entire value of the consumers' connected fabric is centralized and under the ownership and control of a single $3^{rd}$ party entity.

With Moore's law, today's client-side processors and memories at the network edge have achieved significant computing capacity allowing them to get autonomous and without cloud dependency. Further, the transition from 4G to 5G will be focused towards a network transformation which will lead to a computing continuum that scales from on-device, to edge network of devices, to micro-datacenters of edge cloud, to data warehouse, whereby computing workloads can be scheduled in a distributed manner across this network compute continuum. These technological trends can be exploited to overcome the limitations of a cloud first architecture.

There is a thus a need for a method and a system to securely and with complete user data privacy, manage the access to a resource in a scalable, private by design, decentralized, secure, fully self-owned, peer-to-peer IP based mesh overlay network infrastructure fabric for connecting things, applications, devices and services for the IoE.

SUMMARY

One or more shortcomings of the prior art are overcome, and additional advantages are provided through the present disclosure. Additional features and advantages are realized through the techniques of the present disclosure. Other embodiments and aspects of the disclosure are described in detail herein and are considered a part of the claimed disclosure.

Accordingly, the present disclosure relates to a method of managing a decentralized access to a resource in an IP-based mesh overlay network of one or more nodes. The method comprising receiving a request, for accessing one or more resources in the mesh overlay network, from a client application of a client device associated with user, wherein the mesh overlay network that comprises one or more gateway nodes, and the one or more resources connected to each of the one or more gateway nodes. The method further comprising determining at least one optimal connection route between the client device and each of the one or more gateway nodes of the mesh overlay network based on network topology of the client device. Based on the at least one optimal connection route, identifying at least one preferred gateway node and establishing a connection, between the client device and the at least one identified gateway node, to enable the client application to access the one or more resources connected with the at least one identified gateway node.

The method further comprising receiving a request for connecting a relay node with the one or more gateway nodes, wherein the request comprises at least network ID, user ID, user role, client application ID, an application access list and a resource access list. The method further comprising generating the relay node for the client application for the network ID and user ID, and a gateway node invite for connecting the one or more gateway nodes with the relay node and receiving a confirmation message indicative of successful creation of a client app proxy node at the one or more gateway nodes created upon receiving the gateway node invite. Furthermore, the method comprising generating a client app node invite for enabling the client application to join the mesh overlay network on receiving the confirmation message.

In another aspect, the present disclosure relates to a system for managing a decentralized access to a resource in an IP-based mesh overlay network of one or more nodes. The system comprises a relay node, comprising at least a processor, and a memory communicatively coupled to the processor. The memory stores processor-executable instructions, which, on execution, cause the processor to receive a request, for accessing one or more resources in the mesh overlay network, from a client application of a client device associated with user, wherein the mesh overlay network that comprises one or more gateway nodes, and the one or more resources connected to each of the one or more gateway nodes. The processor further determines at least one optimal connection route between the client device and each of the one or more gateway nodes of the mesh overlay network based on network topology of the client device. Based on the at least one optimal connection route thus determined, the processor identifies at least one preferred gateway node and establishes a connection, between the client device and the at least one identified gateway node, to enable the client application to access the one or more resources connected with the at least one identified gateway node.

The system further comprises a relay server, comprising at least a processor, and a memory communicatively coupled to the processor. The memory stores processor-executable instructions, which, on execution, cause the processor to receive a request for connecting a relay node with the one or more gateway nodes, wherein the request comprises at least network ID, user ID, user role, client application ID, an application access list and a resource access list. The processor further generates the relay node for the client application for the network ID and user ID, and a gateway node invite for connecting the one or more gateway nodes with the relay node. Furthermore, the processor receives a confirmation message indicative of successful creation of a client app proxy node at the one or more gateway nodes created upon receiving the gateway node invite and generates a client app node invite for enabling the client application to join the mesh overlay network on receiving the confirmation message.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed embodiments. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

Figure 1A:
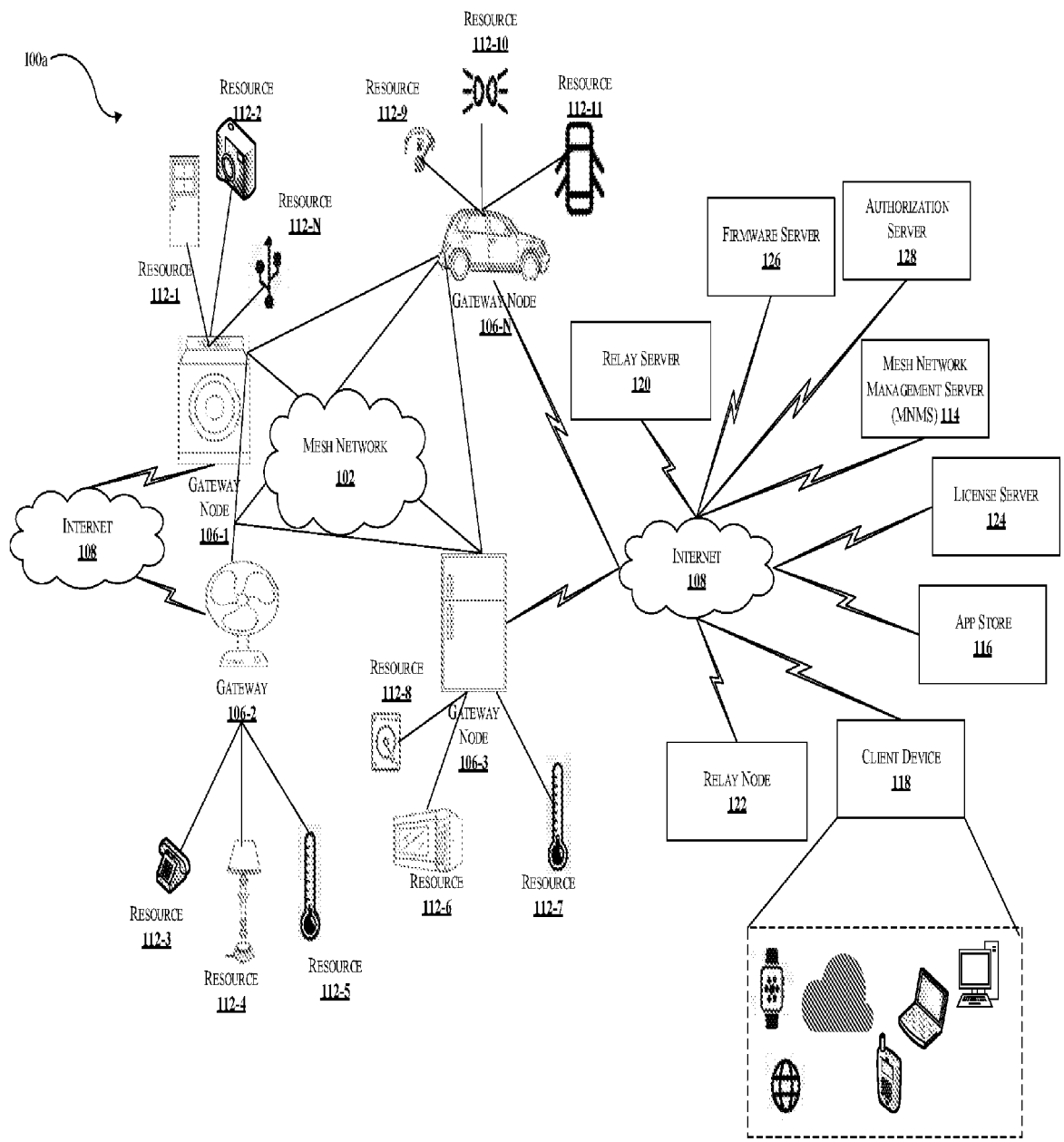
FIG. 1a shows a high-level system architecture of a wireless communication system in accordance with one embodiment of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", "include(s)", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

Embodiments of the present disclosure relate to a method and a system for managing a decentralized access to a resource. The resource may be an Internet of Things (IoT) device or object capable of communicating information to one or more other devices reporting a status of an appliance, or sending instructions to a monitored device in response to monitored data or in response to instructions received from an IoT controller over a network. In one embodiment, the resources connected to an IoT gateway in the network forms a mesh network. A user of a client device having a third-party application installed therein request to join the mesh network based on an invite received from the owner of the IoT gateway. The mesh network comprises one or more IoT gateway. One gateway is identified based on the topology of the client device, and an optimal connection between the client device and the identified gateway is determined. The third-party application may send a resource access request for accessing a resource of the mesh network and access the requested resource through the optimal connection route thus determined. Thus, the disclosure enables a peer-to-peer mesh network infrastructure that allows secure access to the resource by a third-party application without using a cloud server to route the resource access request from the client device to the gateway.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

FIG. 1a shows a high-level system architecture of a wireless communication system 100a in accordance with one embodiment of the present disclosure.

As illustrated, the exemplary wireless communication system (hereinafter referred to as system) 100a includes one or more components configured to create and manage a decentralized, secure, peer-to-peer IP based mesh overlay network. In one embodiment, the peer-to-peer IP based mesh overlay network (hereinafter referred to as mesh network 102) comprises one or more gateway nodes 106-1, 106-2, . . . 106-N (collectively referred to as gateway nodes 106) directly connected to each other to form the mesh network 102 and further communicatively coupled to Internet 108. Further, each of the gateway nodes 106 may be coupled to one or more resources 112-1, 112-2, . . . 112-N (hereinafter collectively referred to as resources 112) performing one or more functions or actions in response to commands from the gateway nodes 106.

Each of the resources 112 may refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. In one example, one of the resources 112 may be an IoE thing that may have a passive communication interface, such as a quick response (QR) code, a radio-frequency identification (RFID) tag, an NFC tag, or the like, or an active communication interface, such as a modem, a transceiver, a transmitter-receiver, or the like. In another example, the resources 112 may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the gateway nodes 106. The resources 112 may also include cell phones, desktop computers, laptop computers, tablet computers, storage devices (networked or wired over USB or PCIe, etc.), printers, fax machines, copiers, personal digital assistants (PDAs), etc. Accordingly, the mesh network 102 may be comprised of a combination of "legacy" Internet-accessible devices (e.g., laptop or desktop computers, cell phones, etc.) in addition to devices that do not typically have Internet-connectivity (e.g., dishwashers, etc.).

In yet another example, the resources 112 may be IoT devices, for example a passive IoT device or an active IoT device. Active IoT devices may detect, store, communicate, act on, and/or the like, changes in attributes of passive IoT devices. Passive IoT devices may include barcoded devices, Bluetooth devices, radio frequency (RF) devices, RFID tagged devices, infrared (IR) devices, NFC tagged devices, or any other suitable device that can provide identifier and attributes to another device when queried over a short-range interface. In another example, the resources 112 may be a service like a network/web service or just a plain old storage medium like hard disk or USB drive.

As illustrated in FIG. 1a, the resources 112 may a door 112-1, a camera 112-2, a telephone 112-3, a light bulb 112-4, a temperature sensor 112-5, a microwave oven 112-6, a temperature sensor 112-7, hard disk 112-8, a meter 112-9 of a vehicle, a lighting unit 112-10, access door 112-11 of the vehicle and so on. Each of the resources 112 may have a unique identifier and a particular set of attributes relating to configuration, state or monitored activities of the resources 112. In one example, the set of attributes may relate to state or status of the resources 112. The state or status may be for example, ON or OFF of the light bulb 112-4, OPEN or CLOSED of the access door 112-11, current temperature setting of the temperature sensors 112-5 and 112-7, AVAILABLE or BUSY of the telephone 112-3, available space of the hard disk 112-8, and so on. Examples of configuration include brightness level to set on the light bulb 112-4, a cooling or heating function, an environmental monitoring or recording function of the temperature sensors 112-5 and 112-7, a light-emitting function of the lighting unit 112-10, a sound-emitting function, etc. that can be embedded in and/or controlled/monitored by a central processing unit (CPU), microprocessor, ASIC, or the like, and configured for connection to an IoT network such as a local ad-hoc network or the Internet 108. Example of monitored activities include access logs on the door 112-1, historical meter readings on the meter 112-9, and so on.

The resources 112 make up a resource sub-network. The resource sub-network is a group of resources 112 connected to each gateway node 106 using either Wired protocols [PCI, PCIe, USB, CAN, I2C, SPI, UART, RS-485, RS-232, Ethernet, Modbus, KNX, etc.] or Wireless [Zigbee, Bluetooth, Z-wave, Wi Fi, BLE, 2G (GPRS/EDGE), 3G (HSPA, HSDPA, HSUPA), 4G (LTE, NB-IoT), 5G (mm-Wave, sub-6 Ghz), etc.] protocol standards. In one embodiment, some of the gateway node 106 are capable of interfacing with multiple sub-network wired and/or wireless protocols simultaneously. For example, as illustrated in FIG. 1*a*, the resources 112-1, 112-2 form a first resource sub-network connected to the gateway node 106-1. In one example, a washing machine may be the gateway node 106-1, then the washing machine may be capable of interfacing with Zigbee protocol resource such as Light bulb 112-4, with Z-Wave protocol resource such as a relay, or with a wired protocol resource such as sensor wired directly to the gateway node 106-1 to gather diagnostic information. In another example, the resources 112-3, 112-4, and 112-5 form a second resource sub-network connected to the gateway node 106-2. In yet another example, the resources 112-6 and 112-7 form a third resource sub-network connected to the gateway node 106-3. In still another example, the resources 112-8, 112-9 and 112-10 form a fourth resource sub-network connected to the gateway node 106-N. These multiple resources sub-network may be connected to and communicate with the gateway nodes 106 in the mesh network 102 using wired or wireless communication protocols. In another embodiment, some of the gateway nodes will only be capable of interfacing one single sub-network wired or wireless protocol.

Each of the gateway nodes 106 may be for example, an IoE gateway or controller that is configured to observe, monitor, control and manage various actions of the connected IoE devices. For example, each of the gateway nodes 106 can communicate with the mesh network 102 over a direct wired/wireless connection to monitor or manage attributes, activities, or other states associated with the resources 112 in the wireless communications system 100*a*. The gateway nodes 106 may also be communicatively coupled to the Internet 108 over a wired or wireless connection and may obtain information from the Internet 108 that can be used to further monitor or manage attributes, activities, or other states associated with the resources 112. In one embodiment, each gateway node 106 may be a standalone device or one of the resources 112, capable of monitoring or controlling other resources 112 connected to the gateway nodes 106. For example, the gateway node 106-1 i.e., washing machine in FIG. 1*a*, provide functionalities such as controlling the wash or dry cycle, and in addition to controlling connected resources such as camera 112-2 and light bulb 112-4. The gateway nodes 106 may include a physical device or an integrated software application running on a physical device. The gateway nodes 106 may include a user interface that can output information relating to the monitored attributes, activities, or other states associated with the resources 112 and receive input information to control or otherwise manage the attributes, activities, or other states associated therewith. In one aspect, each of the gateway nodes 106 may be directly coupled to the resources via wired network. In another embodiment, each of the gateway nodes 106 may be connected to the resources 112 via short-range radio wireless communication networks such as Bluetooth, ZigBee and Infrared Transmission. Accordingly, the gateway nodes 106 may generally include various components and support various wired and wireless communication interfaces to observe, monitor, control, or otherwise manage the various components in the system 100*a*.

The system 100*a* comprises a mesh network management server (hereinafter referred to as management server) 114, and an app store (interchangeably referred to as app repository) 116 coupled to the gateway nodes 106 via the Internet 108. In one embodiment, the app repository 116 stores at least one master application (hereinafter referred to as Master App) that provides standardized features such as network management and control of common resources such as light bulbs. The app repository 116 also stores one or more third-party applications (hereinafter referred to as Third-Party Apps) in the app repository 116 that may provide either alternative implementations of the standardized features or custom implementations of specialized IoE applications, for example, remote video monitoring, management of heating/cooling systems in a building, monitoring of wearable medical devices and so on.

The app repository 116 may comprise one or more client applications that may be configured on at least one user device or the client device 118 enabling access to the gateway nodes 106 and the resources 112 via the mesh network 102. The client device 118 may be a portable electronic device such as a mobile phone, a smart phone, smart watch, smart glass, a gaming device, a music player, a notebook or a desktop computer, or a personal digital assistant, or a server running on the cloud for example. In addition, as is known in the art, the client device 118 can include multiple features or applications such as a camera, a music player, or an Internet browser. The client device 118 comprises the one or more client applications (hereinafter referred to as client application) to connect with the mesh network 102 for accessing the resources 112 in the mesh network 102.

The system 100*a* further comprises components that enable creation of the mesh network 102, for example, a relay server 120, a relay node 122, a license server 124, a firmware server 126 and an authorization server 128 coupled to the Internet 108. Each of the management server 114, the relay server 120, the relay node 122, the license server 124, the firmware server 126, and the authorization server 128 may be implemented as a plurality of structurally separate servers, or alternately may correspond to a single server connected via the Internet 108. The Internet 108 includes a number of routing agents and processing agents (not shown in FIG. 1*a*). The Internet 108 is a global system of interconnected computers and computer networks that uses a standard Internet protocol suite (e.g., the Transmission Control Protocol (TCP)/IP or User Datagram Protocol (UDP)/IP to communicate among disparate devices/networks. TCP/IP provides end-to-end connectivity specifying how data should be formatted, addressed, transmitted, routed and received at the destination.

The management server 114 is capable of validating and granting permission to a requesting entity based on the authorizations, permissions allocated to the entities. Entities may be for example, the gateway nodes 106, the client device 118, and one or more client applications requesting access to the resources 112. In one embodiment, the management server 114 receives a request from one of the gateway nodes 106 for joining the mesh network 102. The gateway nodes 106 may request joining of the mesh network 102 via client application configured on the client device 118. The management server 114 provisions the license and firmware of the requesting gateway node before adding the gateway node to the mesh network 102. The license server 124 validates and grants licenses to the requesting gateway nodes 106 and the client application. The firmware server 126 is capable of hosting firmware information that can be queried and downloaded by the gateway nodes 106 depending on the manufacturer, model, current firmware version, etc., of the gateway nodes 106 upon successful validation and grant of license by the license server 124.

If the mesh network 102 is not yet created, the management server 114 enables creation of a new mesh network 102 and adds the requesting gateway node to the mesh network 102. In another aspect, if the mesh network 102 already exists, the management server 114 merely adds the requesting gateway node to the mesh network 102. In one embodiment, the management server 114 also enables addition of one or more resources 112 to each of the gateway nodes 106 and sharing of resource data of each gateway node with all gateway nodes 106. The relay server 120 may be configured to enable creation, management and removal of the relay node that assists to establish direct connection between peers such as the client device 118 and the gateway nodes 106, if the peers are unable to establish a direct connection between them. The relay server 120 also enables the creation of mesh overlay network 102 by provisioning the nodes in the mesh network 102 such as the client app node, the client app proxy node and the gateway node.

Figure 1B:
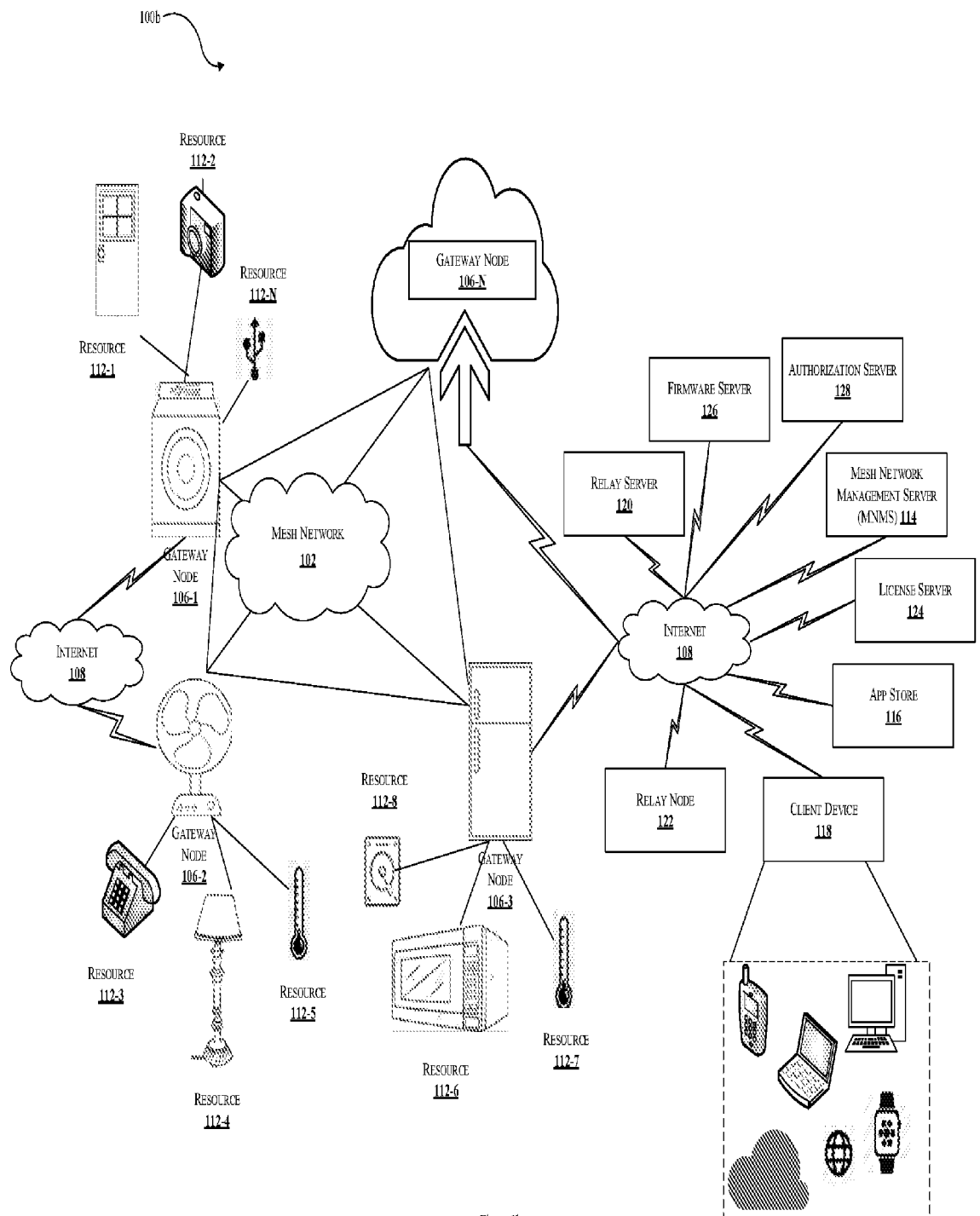
FIG. 1b shows a high-level system architecture of a wireless communication system in accordance with another embodiment of the present disclosure.
Figure 1C:
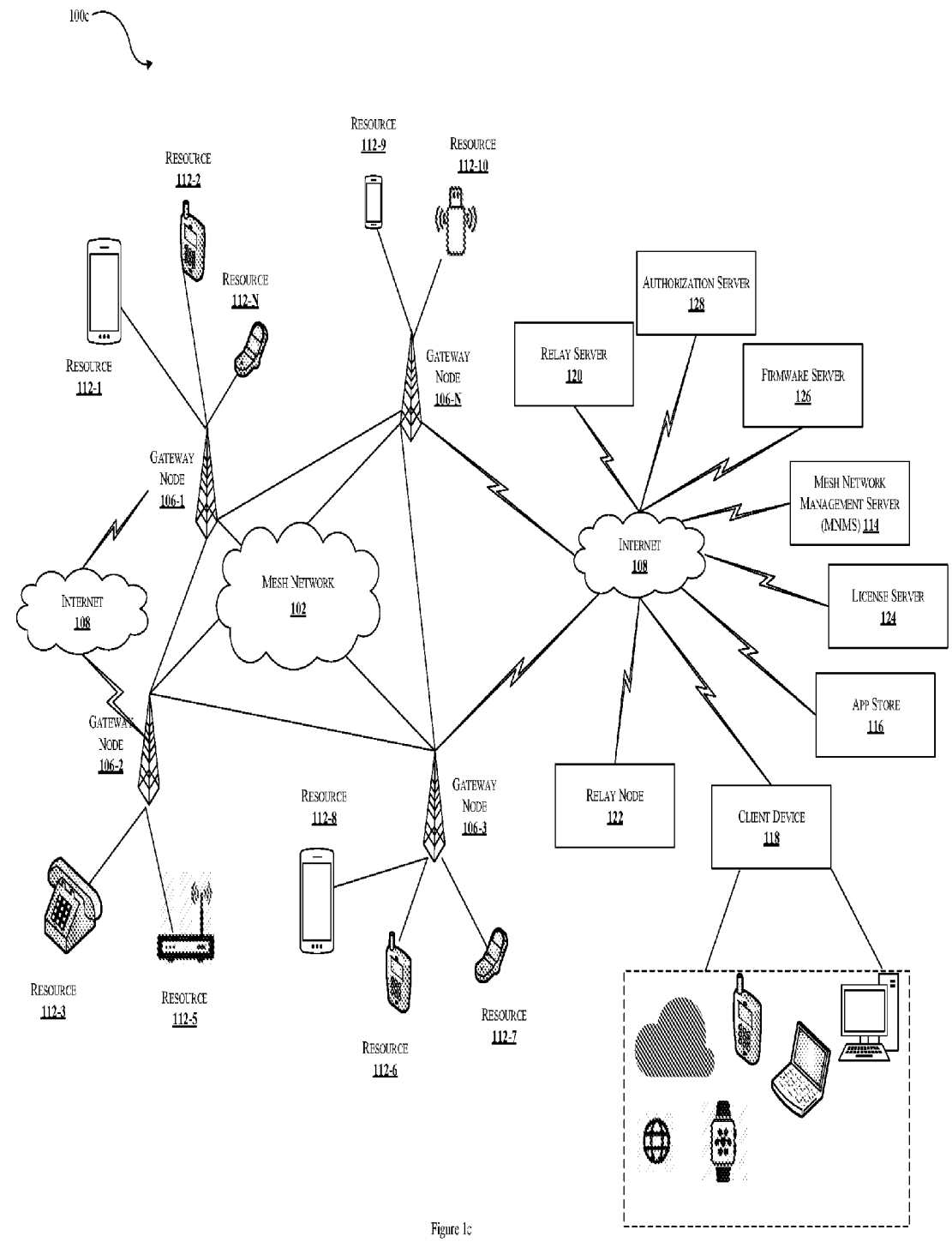
FIG. 1c shows a high-level system architecture of a wireless communication system in accordance with yet another embodiment of the present disclosure.

As such, for brevity and ease of description, various details relating to certain components in the wireless communication systems 100b, 100c and 100d as shown in FIG. 1b, FIG. 1c and FIG. 1d respectively, may be omitted herein to the extent that the same or similar details have already been provided above in relation to the wireless communication system 100a as illustrated in FIG. 1a.

Referring to FIG. 1b, the wireless communication system 100b may include the mesh network 102 comprising the gateway nodes 106 and the resources 112. As illustrated, the gateway node 106-N may be a cloud service controlling the resources 112 in the mesh network 102. The gateway node 106-N may be coupled to the Internet 108 to control the resources 112 in the mesh network 102.

Referring to FIG. 1c, the wireless communication system 100c may be a cellular communication system that includes long range radio devices acting as gateway nodes 106 in the mesh network 102. All the gateway nodes 106 are connected to the Internet 108 in FIG. 1c. Referring to FIG. 1d, the wireless communication system 100d may be a cellular communication system that includes long range devices in the mesh network 102 wherein only few gateway nodes 106 are connected to the Internet 108.

As illustrated in FIG. 1c and FIG. 1d, each of the gateway nodes 106 may be a long-range radio device for example, a base station capable of transmitting and receiving communication signals to and from the resources 112 i.e., one or more mobile stations. Each of the resources 112 may also be a long-range radio device for example, a mobile station capable of receiving and transmitting communication signals from and to the gateway nodes 106 i.e., the one or more base stations. The resources 112 may be for example, a transmitter, a receiver, a modem, a transceiver, a smart phone and other long-range radio devices.

Figure 2A:
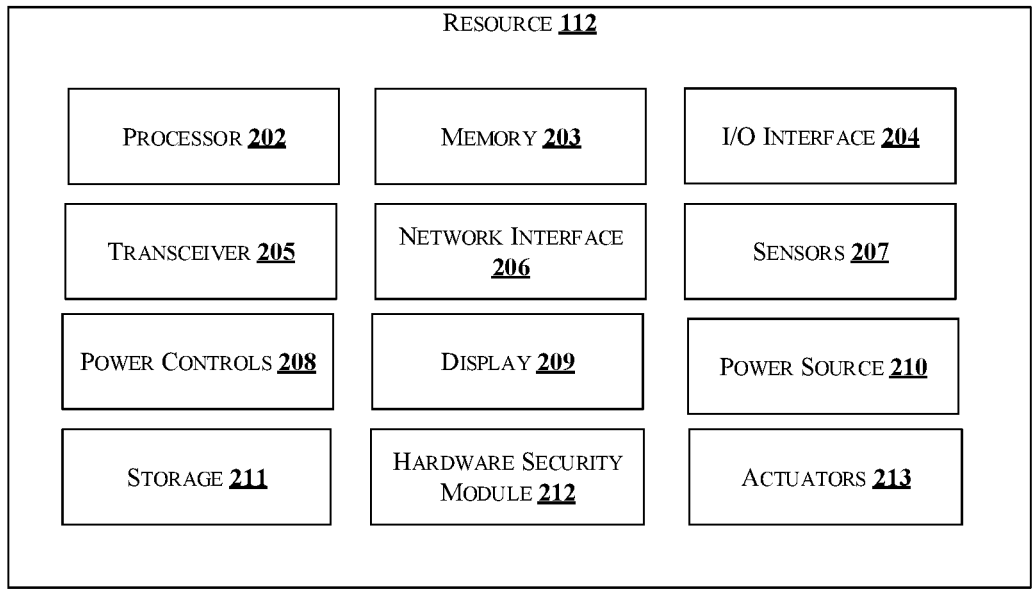
FIG. 2a illustrates an exemplary block diagram of a resource of FIG. 1 in accordance with some embodiments of the present disclosure.

FIG. 2a illustrates an exemplary block diagram of one of the resources 112 in accordance with some embodiments of the present disclosure. While external appearances and/or internal components can differ significantly among resources 112, most of the resources 112 will have user interface, which may comprise a display and a means for user input. The resources 112 without a user interface can be communicated with remotely over a wired or wireless network. In one embodiment, each of the resources 112 comprises at least a processor 202, at least one memory 203, an I/O interface 204, a transceiver 205, at least one network interface 206, one or more sensors 207, power controls 208, a display 209, power source 210, a storage 211, a hardware security module (HSM) 212 and one or more actuators 213.

The processor 202 may include one or more processors such as microcontroller, microprocessor, application specific integrated circuit (ASIC), digital signal processor (DSP), programmable logic circuit (PLC), or other data processing device, which will be generally referred to as processor 202. The processor 202 can execute application programming instructions stored within the memory 203 of the resources 112. The memory 203 can include one or more of read-only memory (ROM), random-access memory (RAM), electrically erasable programmable ROM (EEPROM), or any memory common to computer platforms. The storage 211 can include one or more of Flash cards, Hard Disks and Solid-State Drives or any persistent storage media. The I/O interface 204 is coupled with the processor 202 and an I/O device. The transceiver 205 may comprise one or more external antennas or one or more integrated antennas that are not limited to Wi-Fi antennas, cellular antennas, satellite position systems (SPS) antennas (for example Global Positioning System (GPS) antennas) and so on. The I/O device is configured to allow the processor 202 to communicate with and control from various I/O devices such as the display 209, the power controls 208, the transceiver 205, the sensors 207, the actuators 213 and other devices associated with the resources 112. The I/O device is configured to receive inputs via the I/O interface 204 and transmit outputs for displaying through the display 209 in the I/O device via the I/O interface 204. In one embodiment, the I/O interface 204 is used by the gateway nodes 106 to connect to the resources 112 directly using UART, SPI, PCIe, or other such well known connectors. The display 209 may be a touch-screen display powered by the power source 210 and the power controls 208 may control the supply of the power from the power source 210 to the other components of the resources 112. In one example, the power source 210 may be A/c power supply or battery.

The processor 202 is configured to receive and/or transmit information using the transceiver 205 that may be a wireless communication interface such as Wi-Fi, Long-Term Evolution (LTE) Direct, etc. In another embodiment, the processor 202 is configured to receive and/or transmit information that includes sensory or hardware measurement provided by the sensors 207 so as to enable the resources 112 to monitor the local environment. The processor 202 is also configured to transmit signal to the actuators 213 which convert the received signal into a corresponding energy to drive a mechanism controlling physical movement in the resources 112 for example, like switching on a light bulb 112-4. The processor 202 may store the monitored information in the storage 211. Furthermore, the processor 202 is configured to execute instructions so as to control the respective hardware elements to perform respective functions. The network interface 206 enables connection of the resources 112 with the gateway nodes 106 nodes via wired or wireless communication protocols. The HSM 212 provides a tamper-proof, highly available secure enclosure to perform a variety of cryptographic operations such as key management, key exchange, encryption etc., to enable strong authentication and a secure means of storing data on the resources 112 and exchanging data with other devices in the mesh network 102.

As will be appreciated by those skilled in the art, the various logic elements can be embodied in discrete elements, software modules executed on a processor (e.g., processor 202) or any combination of software and hardware to achieve the functionality disclosed herein. For example, the transceiver 205, the processor 202, the memory 203, the I/O interface 204 and the storage 211 may all be used cooperatively to load, store and execute the various functions disclosed herein and thus the logic to perform these functions may be distributed over various elements. Alternatively, the functionality could be incorporated into one discrete component. Therefore, the features of the resources 112 in FIG. 2a are to be considered merely illustrative and the disclosure is not limited to the illustrated features or arrangement.

In one example, one of the resources 112 may be a light bulb 112-4 with a unique identifier. The light bulb may comprise multiple endpoints. An example of multiple endpoints is a panel of switches that comprises relays. Each switch on the panel is an endpoint which may be connected to a thin light bulb (a light bulb without any processing capability). The relay can be controlled through software to control the ON/OFF state of the light bulb connected to each switch. Each switch having a capability of powering ON/OFF and level controlling features. The switches may comprise the actuators 213 linked to the microprocessor inside the light bulb 112-4. The actuators 213 directly controls the ON/OFF state of the light bulb 112-4 without the physical switch being flipped, and the actuators 213 can be directly triggered by the processor 202. The actuators 213 may also control the luminescence of the light bulb 112-4 when directly triggered by the processor 202. The processor 202 may monitor the state of the light bulb 112-4 comprising ON/OFF status, current luminescence level and store the monitored state information in the storage 211. The display 209 may display the current state information of the light bulb 112-4. The switch panel may be powered by the power source 210 controlled by the power controls 208. The transceiver 205 may transmit the stored state information to a remote device such as gateway nodes 106 for further processing.

Figure 2B:
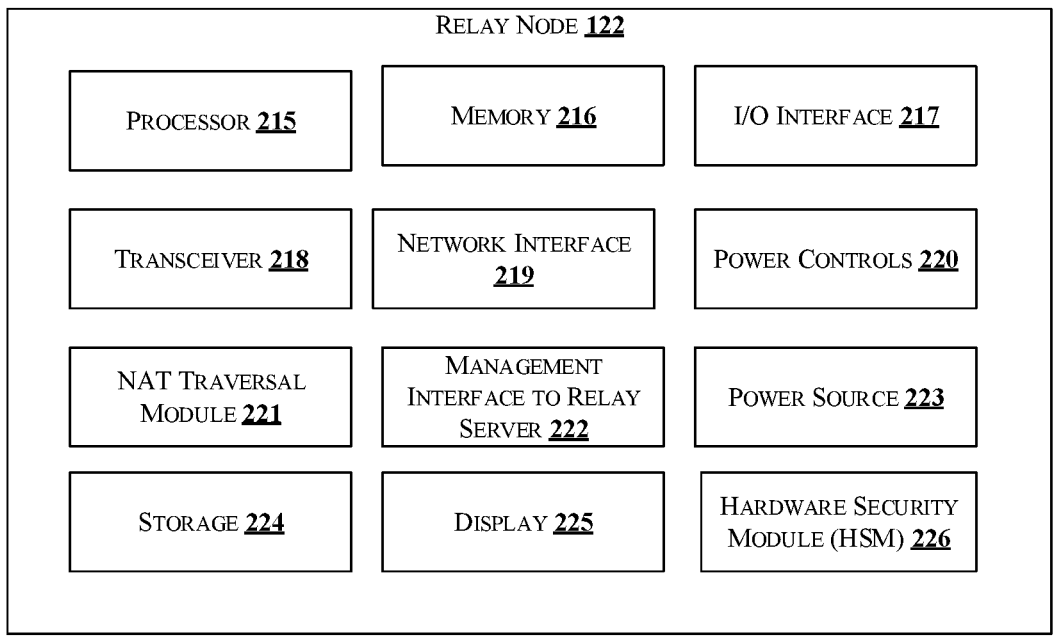
FIG. 2b illustrate an exemplary block diagram of a relay node of FIG. 1 in accordance with some embodiments of the present disclosure.

FIG. 2b illustrate an exemplary block diagram of the relay node 122 in accordance with some embodiments of the present disclosure.

The relay node 122 may be a node in the mesh network 102 capable of enabling peer-to-peer connection between a client application on the client device 118 and each of the gateway nodes 106 to enable the client application to access the resources 112 connected with the each of the gateway nodes 106. In one embodiment, the relay node 122 is a mesh node having a well-known/static domain name and capable of enabling peer-to-peer connection using UDP hole punching to exchange information between the client device 118 and the one or more gateway nodes 106 using Network Address Translation (NAT) traversal technique. The relay node 122 exchanges dynamic IP addresses of the client device 118 and the one or more gateway nodes 106 in the mesh network 102 to establish the peer-to-peer connection between the client device 118 and the one or more gateway nodes 106. In another embodiment, if the peer-to-peer connection is not established, the relay node 122 creates a tunnel connection between the client device 118 and the one or more gateway nodes 106 in the mesh network 102. In one embodiment, the relay node 122 facilitates TCP tunneling between the client device 118 and the one or more gateway nodes 106 to establish the peer-to-peer connection.

The relay node 122 may be a typical mesh node as illustrated in FIG. 2b. In one embodiment, the relay node 122 comprises at least a processor 215, a memory 216, an I/O interface 217, a transceiver 218, network interface 219, power controls 220, NAT traversal module 221, management interface to relay server 222, power source 223, storage 224, display 225 and Hardware security module (HSM) 226. The processor 215 may include one or more processors, microcontroller, microprocessor, application specific integrated circuit, digital signal processor (DSP), programmable logic circuit, or other data processing device, which will be generally referred to as processor 215. The processor 215 can execute application programming instructions stored within the memory 216 of the relay node 122. The memory 216 can include one or more of read-only memory (ROM), random-access memory (RAM), electrically erasable programmable ROM (EEPROM), or any memory common to computer platforms. The storage 224 can include one or more of Flash cards, Hard Disks and Solid-State Drives or any persistent storage media. The I/O interface 217 is coupled with the processor 215 and an I/O device.

The I/O device is configured to receive inputs via the I/O interface 217 and transmit outputs for displaying in the I/O device via the I/O interface 217. The transceiver 218 may comprise one or more external antennas or one or more integrated antennas that are not limited to Wi-Fi antennas, cellular antennas, satellite position systems (SPS) antennas (for example Global Positioning System (GPS) antennas) and so on. The I/O device is configured to allow the processor 215 to communicate with and control from various I/O devices such as the display 225, the power controls 220, the transceiver 218 and other devices associated with the relay node 122. The I/O device is configured to receive inputs via the I/O interface 217 and transmit outputs for displaying through the display 225 in the I/O device via the I/O interface 217. In one embodiment, the I/O interface 217 is used by the gateway nodes 106 to connect to the relay node 122 directly using UART, SPI, PCIe, or other such well known connectors. The display 225 may be a touchscreen display powered by the power source 223 and the power controls 220 may control the supply of the power from the power source 223 to the other components of the relay node 122. The power source 223 may be for example, AC power supply or battery.

The network interface 219 enables connection of the relay node 122 with the gateway nodes 106 and the client device 118 via wired or wireless communication protocols. The HSM 226 performs a variety of cryptographic operations such as key management, key exchange, encryption etc., to enable strong authentication and secure means of exchanging data with other devices in the mesh network 102.

The NAT traversal module 221 determines an optimal route between the client device 118 and the one or more gateway nodes 106 to which the one or more resources 112 is connected with and enables tunneling the traffic from the client device 118 to the gateway nodes 106 through the optimal route. The processor 215 stores the one or more optimal routes determined by the NAT traversal module 221 in the storage 224. The management interface to the relay server 222 enables the relay node 122 to interact with the relay server 120.

As will be appreciated by those skilled in the art, the various elements can be embodied in discrete elements, software modules executed on a processor (e.g., processor 215) or any combination of software and hardware to achieve the functionality disclosed herein. For example, the transceiver 218, the processor 215, the memory 216, the I/O interface 217 and the storage 224 may all be used cooperatively to load, store and execute the various functions disclosed herein and thus the logic to perform these functions may be distributed over various elements. Alternatively, the functionality could be incorporated into one discrete component. Therefore, the features of the relay node 122 in FIG. 2b are to be considered merely illustrative and the disclosure is not limited to the illustrated features or arrangement.

Figure 2C:
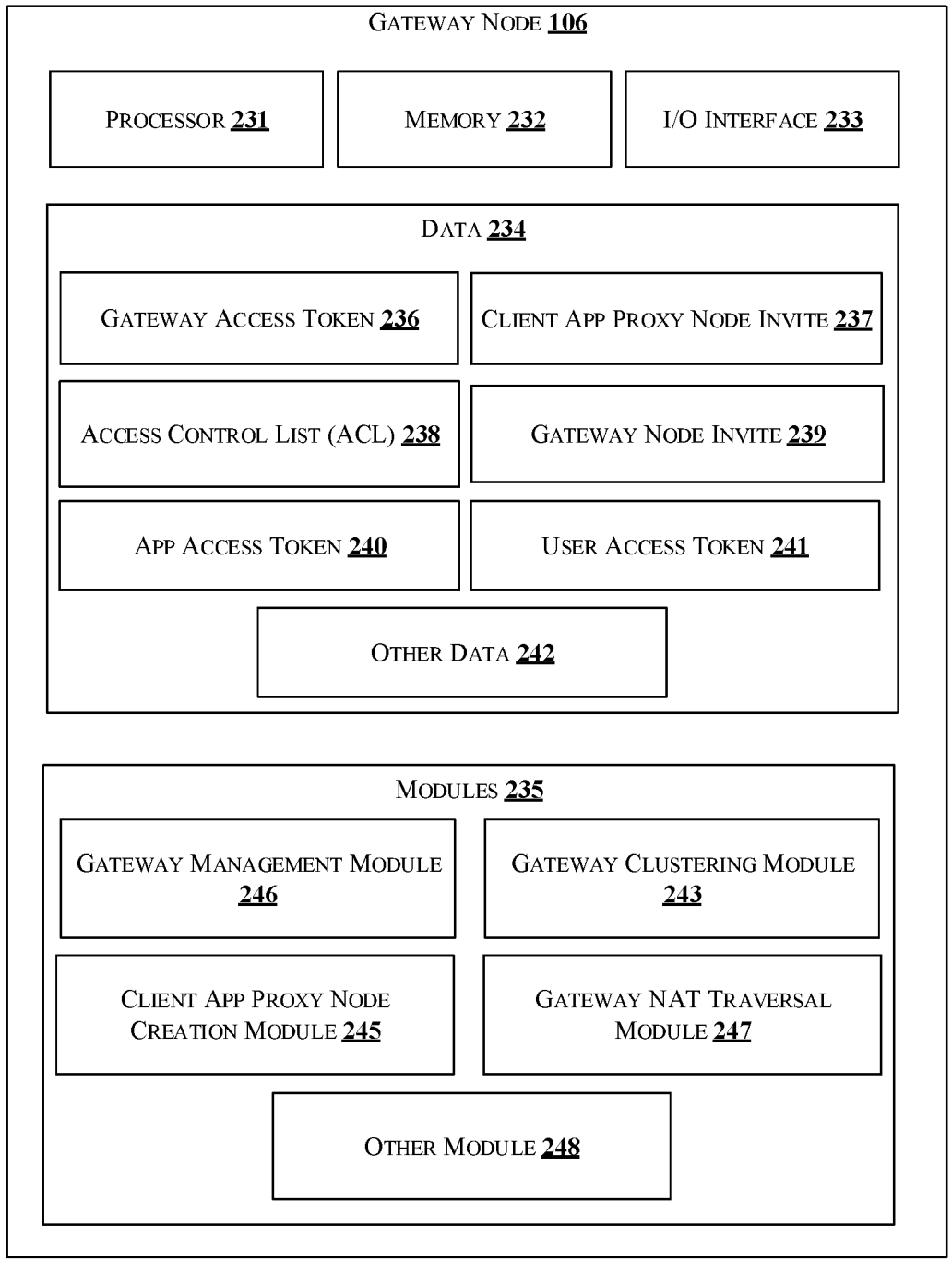
FIG. 2c illustrate an exemplary block diagram of a gateway node of FIG. 1 in accordance with some embodiments of the present disclosure.

FIG. 2c illustrates an exemplary block diagram of one of the gateway nodes 106 in accordance with some embodiments of the present disclosure;

Each of the gateway nodes 106 control one or more of the resources 112 in the mesh network 102. In one embodiment, each of the gateway nodes 106 receive resource information updates from the resources 112 connected to each of the gateway nodes 106 and control the resources 112 based on the received resource information updates. Each of the resources 112 consider each of the gateway nodes 106 as peer and transmit the resource information updates including attribute information to each of the gateway nodes 106. In one example, as illustrated in FIG. 1a, the resource 112-4 considers the gateway node 106-2 connected to the resource 112-4 as peer and provides the state information to the gateway node 106-2. The resources 112 connect to the gateway nodes 106 using well known interfaces like wired/wireless interfaces, protocols and web services.

Each of the gateway nodes 106 may be typical controller as illustrated in FIG. 2c. Each of the gateway nodes 106 comprise at least a processor 231, a memory 232, and an I/O interface 233. The I/O interface 233 is coupled with the processor 231 and an I/O device (not shown). The I/O device is configured to receive inputs via the I/O interface 233 and transmit outputs for displaying in display (not shown) of the I/O device via the I/O interface 233. Further, each of the gateway nodes 106 may comprise additional components (not shown) such as a transceiver, a network interface, power controls, power source, storage and Hardware security module (HSM). The network interface enables connection of the resources 112 with the gateway nodes 106 via wired or wireless communication protocols. The network interface also enables the communication between the gateway nodes 106 and the relay server 120. The network interface further enables the communication between the gateway nodes 106 and the management server 114. The HSM performs a variety of cryptographic operations such as key management, key exchange, encryption etc., to enable strong authentication and secure means of exchanging data with other devices in the mesh network 102.

Each of the gateway nodes 106 further comprises data 234 and modules 235. In one implementation, the data 234 and the modules 235 may be stored within the memory 232. In one example, the data 234 may include at least one gateway access token 236, client app proxy node invite 237, access control list (ACL) 238, gateway node invite 239, app access token 240, user access token 241 and other data 242.

The "access token" is, for example, a cryptographic block of data that can only be created or modified by an authorized entity for verification. By using the access token, it can be verified that the token was created only by the authorized entity and never modified after creation. A client device can perform self-authentication purely by virtue of possessing the access token, since it can be verified that the authorized entity created the token and that the token was not modified after creation. The access token is created using a cryptographic private key (which is only possessed by the authorized entity creating the tokens) and verified by means of a cryptographic public key (which may be distributed to whomsoever needs to verify the token). The private key and public key are a pair that function together.

In one embodiment, the gateway access token 236 may be an access token generated by the management server 114 to be used by a specific gateway node for authenticating the specific gateway node to the management server 114. The app access token 240 may be an access token generated by the authorization server 128 to be used by a specific client app for authenticating the specific client app to the authorization server 128 or the management server 114. The app access token 240 is generated by the authorization server 128 to self-authenticate a specific client application to the gateway nodes 106 during when a user of the specific client application requests for ownership of the gateway nodes 106. The authorization server 128 shares the cryptographic public key that may be used by the management server 114 to verify the access token. The user access token 241 may be an access token generated by the authorization server 128 to be used by a specific client app for authenticating the user logged on the client app to the management server 114.

The client app proxy node invite 237 is an invite generated by the relay node 122 for a client app proxy node on the gateway nodes 106 to join the mesh network 102. After successful ownership of the gateway nodes 106, the gateway nodes 106 may join the mesh network 102 using the gateway node invite 239. The gateway node invite 239 is an invite generated by a network management node for each of the gateway nodes 106 to join the mesh network 102. The network management node is a node in the mesh network 102 that manages the gateway nodes 106 of the same mesh network 102. The mesh network 102 may be for example, device mesh network that is an inter-connection collection of one or more nodes including gateway nodes 106 and the network management node that manages the gateway nodes 106. Each of the gateway nodes 106 may communicate with the client application on the client device 118 using an intermediary client app proxy node that serves as a connecting node between a client app node and the gateway nodes 106. The client app node is an instance of the client application created in the mesh network 102 to serve as connecting node between the client application and client app proxy node. The client app proxy node joins the mesh network 102, during addition of the gateway nodes 106 to the mesh network 102, using the client app proxy node invite 237 generated by the relay server 120.

In an embodiment, the mesh network 102 may be a client app mesh network, wherein the client app proxy node joins during addition of the gateway nodes 106. The client app mesh network (not shown) is an inter-connected collection of nodes including client app node, one client app proxy node for each of the gateway nodes 106 and the relay node 122. The client app proxy node enables the client app node of the client application to connect with specific gateway node of the gateway nodes 106 to access the resources 112 connected with the specific gateway node. The specific gateway node allows the client app node of the client application to access the resources 112 connected with the specific gateway node based on the ACL 238 corresponding to the client application.

The ACL 238 is a list of specific permissions to capabilities of each of the endpoints of the resources 112 that are granted to the client application. Each endpoint is provided with a list of capabilities that the client application is permitted to access. Each client application is granted with at least one ACL 238. Based on the specific permissions granted in the ACL 238, the gateway nodes 106 allow the client application to access the resources 112 connected to the gateway nodes 106. For example, if the resource 112 is a switch panel having three endpoints representing switches which as labelled as "A", "B" and "C". Each switch may have ON/OFF capability and a level control capability. The ACL 238 for the client application may comprise ON/OFF capability to the endpoint A, and ON/OFF capability as well as level control capability to the endpoint B. The gateway nodes 106 will not allow the client application to access the level control capability in endpoint A or any capability of endpoint C that are not granted to the client application.

In one embodiment, the data 234 may be stored in the memory 232 in the form of various data structures. Additionally, the aforementioned data can be organized using data models, such as relational or hierarchical data models. The other data 242 may also be referred to as reference repository for storing reference data and data used during the functions of the gateway nodes 106. The other data 242 may also store data, including temporary data and temporary files, generated by the modules 235 for performing the various functions of the gateway nodes 106.

The modules 235 may include, for example, a gateway clustering module 243, a client app proxy node creation module 245, a gateway management module 246, and a gateway NAT traversal module 247. In one embodiment, the gateway management module 246 enables provisioning and ownership of the gateway nodes 106. The gateway clustering module 243 synchronizes updates of shared information at one gateway node with all other gateway nodes. Shared information includes for example, commands, command execution status, resource lists, resource state information and the ACL 238. The client app proxy node creation module 245 enables creation of the intermediary client app proxy node that serves as a connecting node between the client app node and the gateway nodes 106 during addition of the gateway nodes 106 to the mesh network 102. The gateway NAT traversal module 247 determines an optimal route between the client device 118 and the one or more gateway nodes 106 to which the one or more resources 112 is connected with and enables tunneling the traffic from the client device 118 to the resources 112 through the optimal route. The processor 231 stores the one or more optimal routes determined by the gateway NAT traversal module 247 in the storage (not shown).

The modules 235 may also comprise other modules 248 to perform various miscellaneous functionalities of the gateway nodes 106. It will be appreciated that such aforementioned modules may be represented as a single module or a combination of different modules. The modules 235 may be implemented in the form of software, hardware and/or firmware.

As will be appreciated by those skilled in the art, the various logic elements can be embodied in discrete elements, software modules executed on a processor (e.g., processor 231) or any combination of software and hardware to achieve the functionality disclosed herein. For example, the transceiver, processor 231, memory 232, I/O interface 233 and storage may all be used cooperatively to load, store and execute the various functions disclosed herein and thus the logic to perform these functions may be distributed over various elements. Alternatively, the functionality could be incorporated into one discrete component. Therefore, the features of the gateway nodes 106 in FIG. 2c are to be considered merely illustrative and the disclosure is not limited to the illustrated features or arrangement.

Figure 2D:
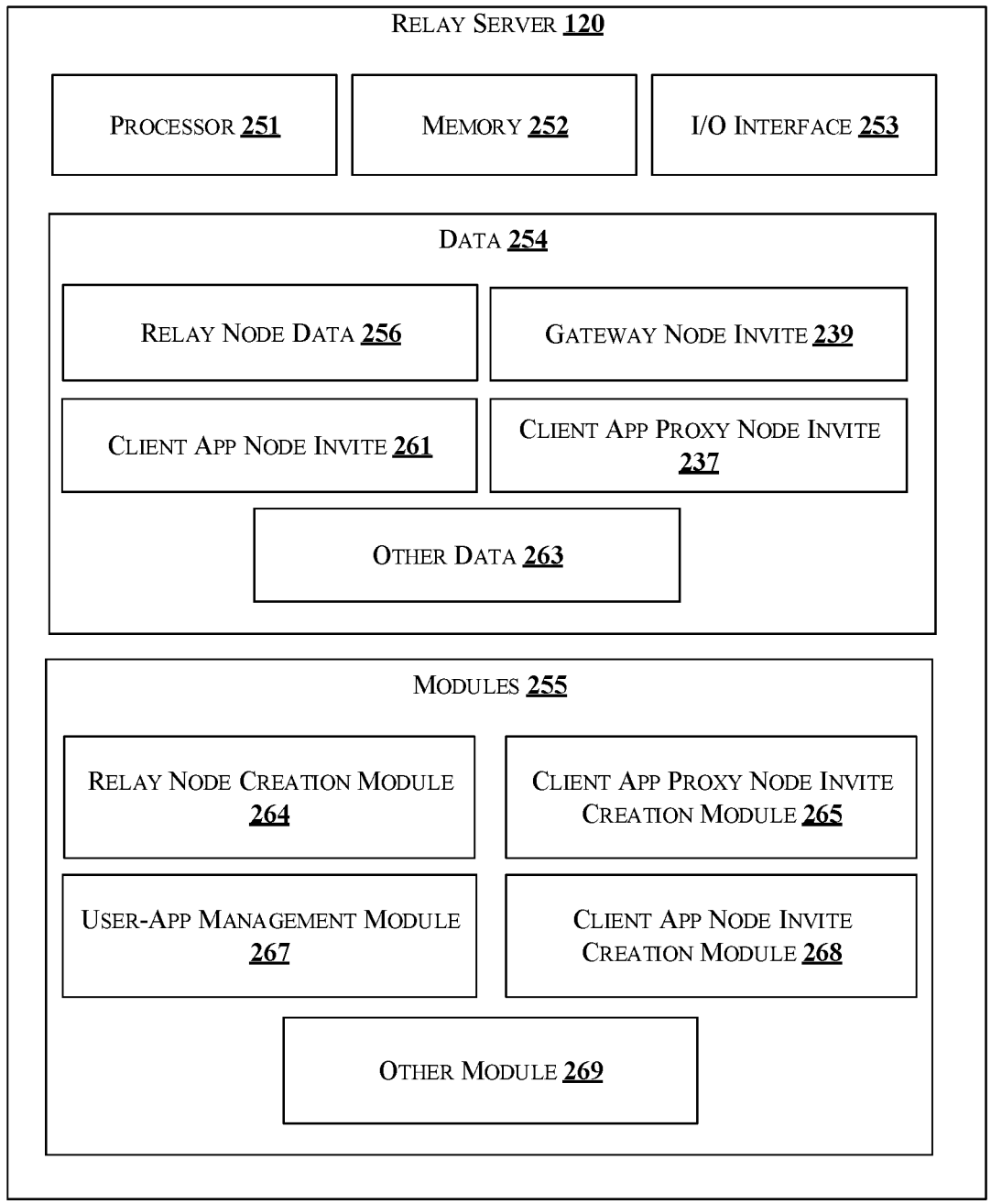
FIG. 2d illustrate an exemplary block diagram of a relay server of FIG. 1 in accordance with some embodiments of the present disclosure.

FIG. 2d illustrate an exemplary block diagram of the relay server 120 in accordance with some embodiments of the present disclosure;

The relay server 120 may be implemented as a plurality of structurally separate servers, or alternately may correspond to a single server. The relay server 120 enables provisioning, maintenance and deletion of relay nodes. The relay nodes establishes direct connection between peers if the peers are unable to establish a direct connection. In cases, when direct connection is not possible due to presence of sophisticated Network Address Translation (NAT) servers, firewalls, proxy servers in the network, the relay nodes establishes the direct connection. In one embodiment, if the client device 118 is unable to establish direct connection with the gateway nodes 106 to which the resources 112 are connected, a secure connection may be established through the relay server 120 which is known to any external client device or system.

The relay server 120 may be typical relay server as illustrated in FIG. 2d. The relay server 120 comprise a processor 251, a memory 252, and an I/O interface 253. The I/O interface 253 is coupled with the processor 251 and an I/O device. The I/O device is configured to receive inputs via the I/O interface 253 and transmit outputs for displaying in the display (not shown) of the I/O device via the I/O interface 253. Further, the relay server 120 may comprise additional components (not shown) such as a transceiver, a network interface, power controls, power source, storage and Hardware security module (HSM). The network interface enables connection of the relay server 120 with the management server 114 and the gateway nodes 106 via wired or wireless communication protocols. The HSM performs a variety of cryptographic operations such as key management, key exchange, encryption etc., to enable strong authentication and secure means of exchanging data with other devices in the mesh network 102.

The relay server 120 further comprises data 254 and modules 255. In one implementation, the data 254 and the modules 255 may be stored within the memory 252. In one example, the data 254 may include relay node data 256, the gateway node invite 239, the client app proxy node invite 237, client app node invite 261, and other data 263. The relay node data 256 may comprise data of the relay node 122 relating to the optimal routes established or existed between the gateway nodes 106 and the resources 112. In one example, the optimal routes may be stored in the storage. During operation, the relay server 120 enables provisioning, maintenance and removal of relay node 122. The relay server 120 provisions the relay node 122 when a request from one of the gateway nodes 106 for joining the mesh network 102 is received by the relay server 120. The management server 114 receives the request from one of the gateway nodes 106 and forwards the request of the gateway nodes 106 to the relay server 120. The request may comprise a request for creating the mesh network 102, if the mesh network 102 does not exist, and adding of the gateway nodes 106 to the mesh network 102. Upon receiving the request for creating the mesh network 102, the relay server 120 creates the Network management (NM) node that administers the gateway nodes 106 of the mesh network 102. The relay server 120 also generates the gateway node invite 239 using which the gateway nodes 106 may join the mesh network 102. In one embodiment, the gateway node invite 239 is generated by the NM node for each of the gateway nodes 106 to join the mesh network 102.

The relay server 120 further receives a request from the client device 118 to access the gateway nodes 106 and/or the resources 112 of the mesh network 102. In one embodiment, the relay server 120 receives a request from the client application of the client device 118 to connect to the relay node 122. In response, the relay server 120 creates the relay node 122 and also generates the client app proxy node invite 237 enabling the creation of the client app proxy node at the gateway nodes 106. The client app proxy node enables the client app node of the client application to connect with specific gateway node of the gateway nodes 106 to access the resources 112 connected with the specific gateway node. The client app node is an instance of the client application created in the mesh network 102 to serve as connecting node between the client application and the client app proxy node. The relay server 120 also generates the client app node invite 261 for enabling creation of the client app node by the client application.

In one embodiment, the data 254 may be stored in the memory 252 in the form of various data structures. Additionally, the aforementioned data can be organized using data models, such as relational or hierarchical data models. The other data 263 may also store data, including temporary data and temporary files, generated by the modules 255 for performing the various functions of the relay server 120.

The modules 255 may include, for example, a relay node creation module 264, a client app proxy node invite creation module 265, a user-app management module 267, and a client app node invite creation module 268. The relay node creation module 264 enables creation of the relay node 122 upon receiving a request from the client application to connect to the relay node 122. The client app proxy node invite creation module 265 of the relay server 120 generates the client app proxy node invite 237 for the creation of the client app proxy node at the gateway nodes 106. The client app proxy node enables the client app node of the client application to connect with specific gateway node of the gateway nodes 106 to access the resources 112 connected with the specific gateway node. Upon successful creation of the client app proxy node, the client app node invite creation module 268 generates the client app node invite 261 for enabling creation of the client app node by the client application. The user-app management module 267 is configured to remove all client app node created for a user upon receiving a request to remove user from MNMS 114. Further, the user-app management module 267 is also configured to remove the relay nodes when the client app node is idle for more than a predetermined number of days. Furthermore, the user-app management module 267 is configured to update Access Control List (ACL) of a user when a user joins the network or remove all ACL of the user when the user leaves the network.

The modules 255 may also comprise other modules 269 to perform various miscellaneous functionalities of the relay server 120. It will be appreciated that such aforementioned modules may be represented as a single module or a combination of different modules. The modules 255 may be implemented in the form of software, hardware and/or firmware.

Figure 2E:
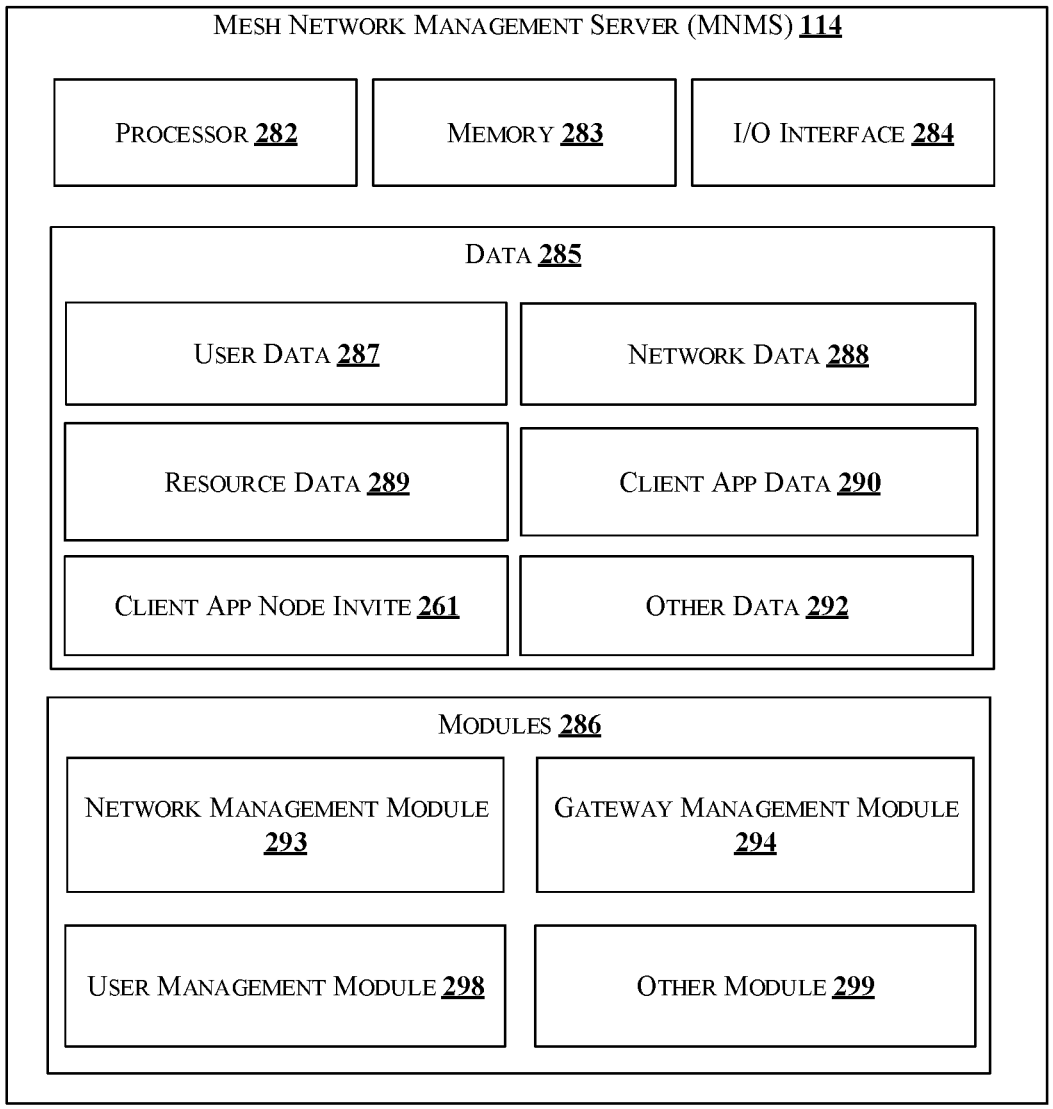
FIG. 2e illustrate an exemplary block diagram of a mesh network management server (MNMS) in accordance with some embodiments of the present disclosure.

FIG. 2e illustrate an exemplary block diagram of the management server 114 in accordance with some embodiments of the present disclosure;

The management server 114 may be implemented as a plurality of structurally separate servers, or alternately may correspond to a single server. The management server 114 is capable of validating and granting permission to a requesting entity based on the authorizations, permissions allocated to the entities. Entities may be for example, the gateway nodes 106, the client device 118, and client applications of the client device 118 requesting access to the resources 112. The management server 114 is also capable of storing network data (for example, the list of gateway nodes in a network) and forwarding mesh network management requests to the relay server 120, upon receiving a mesh network management request from the entity and authenticating the requesting entity.

The management server 114 may be typical management server as illustrated in FIG. 2e. The management server 114 comprises a processor 282, a memory 283, and an I/O interface 284. The I/O interface 284 is coupled with the processor 282 and an I/O device. The I/O device is configured to receive inputs via the I/O interface 284 and transmit outputs for displaying in the display (not shown) of the I/O device via the I/O interface 284. Further, the management server 114 may comprise additional components (not shown) such as a transceiver, a network interface, power controls, power source, storage and Hardware security module (HSM). The network interface enables connection of the management server 114 with the gateway nodes 106, the client device 118 and the relay server 120 via wired or wireless communication protocols. The HSM performs a variety of cryptographic operations such as key management, key exchange, encryption etc., to enable strong authentication and secure means of exchanging data with other devices in the mesh network 102.

The management server 114 further comprises data 285 and modules 286. In one implementation, the data 285 and the modules 286 may be stored within the memory 283. In one example, the data 285 may include user data 287, network data 288, resource data 289, client app data 290, the client app node invite 261, the gateway node invite 239 and other data 292. The user data 287 may comprise user ID and user role assigned to each user of the client application identified by the user ID. The network data (alternatively referred to as network information) 288 comprises network name, network ID, and gateway ID assigned to the gateway nodes 106 including ACL 238. The resource data 289 may comprise resource information including unique identifier of each resource and attribute information of the resources 112. The client app data 290 comprises information associated with the client applications and the client device 118. The client app node invite 261 enables creation of the client app node by the client application.

In one embodiment, the data 285 may be stored in the memory 283 in the form of various data structures. Additionally, the aforementioned data can be organized using data models, such as relational or hierarchical data models. The other data 292 may be also referred to as reference repository for storing reference data. The other data 292 may also store data, including temporary data and temporary files, generated by the modules 286 for performing the various functions of the management server 114.

The modules 286 may include, for example, a network management module 293, a gateway management module 294 and a user management module 298. The gateway management module 294 enables provisioning and ownership of the one or more gateway nodes 106 before joining the mesh network 102. The network management module 293 enables the creation and management of the mesh network 102 such as adding or removal of the gateway nodes 106 and the resources 112. The user management module 298 enables validation of user and user permissions, add and removes user from the mesh network. The modules 286 may also comprise other modules 299 to perform various miscellaneous functionalities of the management server 114. It will be appreciated that such aforementioned modules may be represented as a single module or a combination of different modules. The modules 286 may be implemented in the form of software, hardware and/or firmware.

In operation, if one or more devices/services wishes to provide access to the resources 112, either locally or remotely, then the devices/services need to register as the gateway nodes 106. The requesting devices/services are provisioned to become the gateway nodes 106. Gateway provisioning is a method of provisioning of license and firmware to requesting devices/services to function as the gateway nodes 106. In one embodiment, the requesting devices/services registers/connects with the management server 114 so as to allow the requesting devices/services to progress further/function as the gateway nodes 106.

Gateway provisioning is an important step preformed in order to set up the gateway functionality of the gateway nodes 106. Gateway ownership is the next primary step in order to control the gateway nodes 106 functionality by a user. Adding the gateway nodes 106 to a network is the next primary step for establishing the peer-to-peer mesh network 102.

Figure 3A:
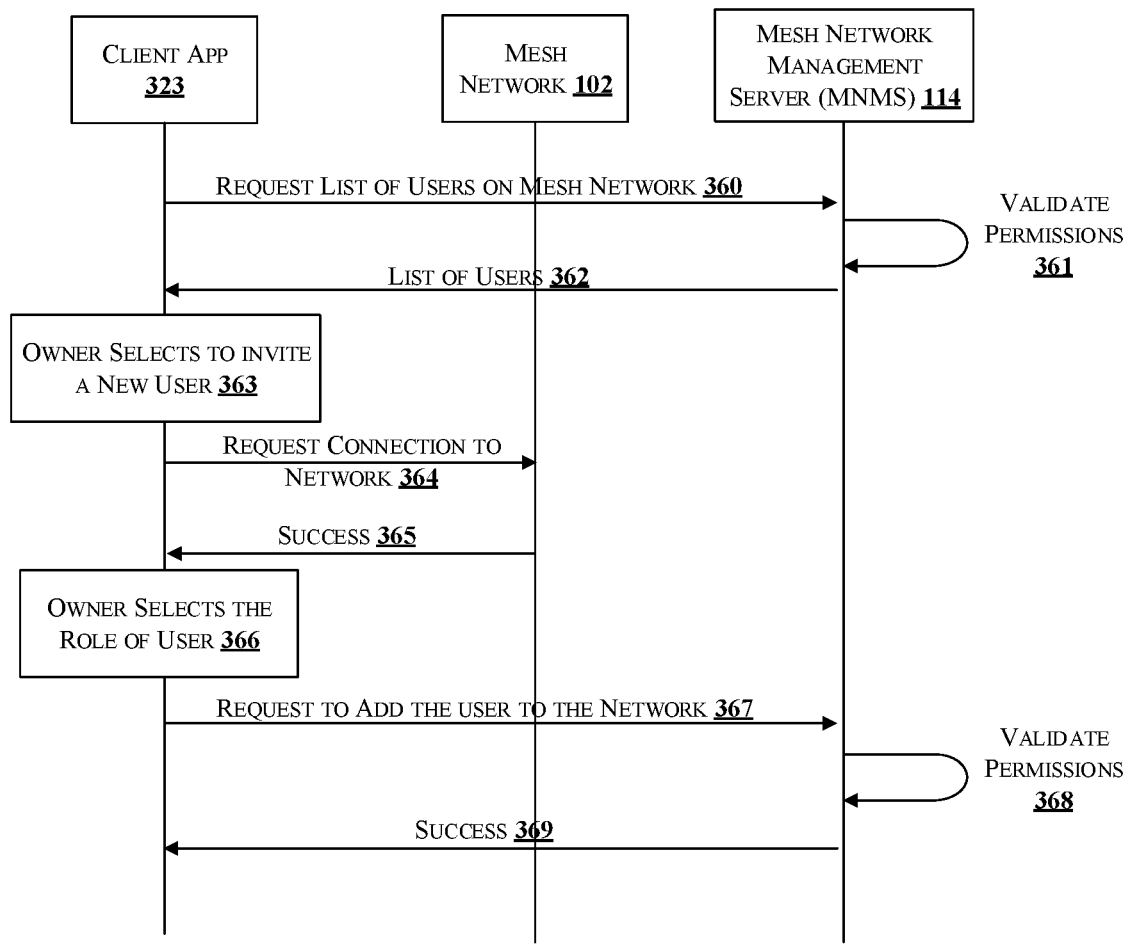
FIG. 3a illustrates an exemplary message sequence for inviting users to the network in accordance with some embodiments of the present disclosure.

FIG. 3a illustrates an exemplary message sequence for inviting users to the network in accordance with some embodiments of the present disclosure.

As illustrated, the client application 323 enables addition of new users to the mesh network 102 by sending an invite. The client application 323 requests for a list of users on the mesh network 102 network at step 360. The request may comprise, for example, network ID and app access token 255 of the client application 323. The management server 114 validates the permissions of the user of the client application 323 in providing the list of users at step 361. In one embodiment, the user management module 298 of the management server 114 verifies the permissions or user role of the client application 323 requesting for the list of users. On successful verification, the management server 114 forwards the list of users to the client application 323 at step 362.

The user of the client application 323 may select option to invite new user at step 363. On user selection, the client application 323 generates a request to connect to the mesh network 102 at step 364. On successful connection with the mesh network 102, the mesh network 102 transmits a SUCCESS message to the client application 323. In one embodiment, the gateway nodes 106 of the mesh network 102 transmits the SUCCESS message to the client application 323 at step 365. The user of the client application 323 may select the role of the user and list of resources that may be accessible by the user at step 366 and transmits the request to add the user to the mesh network 102 to the management server 114 at step 367.

The management server 114 validates the permission of the user of the client application 323 in adding the user to the mesh network 102 based on the request at step 368. In one embodiment, the user management module 298 of the management server 114 verifies the permission of the user of the client application 323 to make such a request. On successful validation, the management server 114 transmits a SUCCESS message at step 369 enabling the client application 323 to generate and transmit an invite for the user to add in the mesh network 102. In one embodiment, the message sequence as described in FIG. 3a may also include a notification engine that create notification for the network invite and transmits the notification to the management server 114. The management server 114 verifies the notification and enables the notification engine to send email to the user or invitee of the mesh network 102. Upon determining successful email delivery confirmation, the management server 114 transmits SUCCESS indicating successful notification of the invite to the network invitee.

Figure 3B:
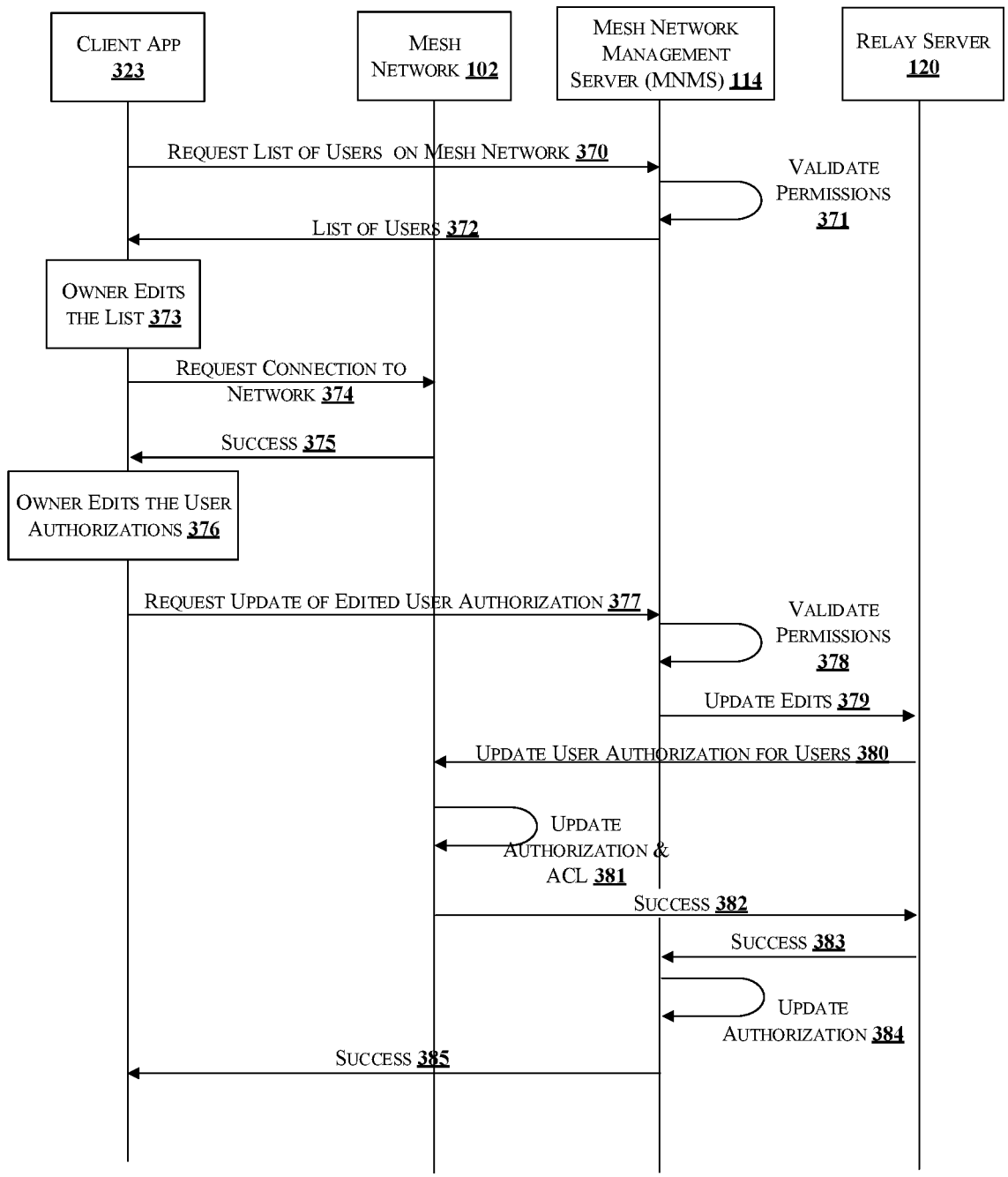
FIG. 3b illustrates an exemplary message sequence for editing resource authorizations for user in accordance with some embodiments of the present disclosure.

FIG. 3b illustrates an exemplary message sequence for editing resource authorizations for user in accordance with some embodiments of the present disclosure.

The user of the client application 323 also can edit the resource authorizations provided to the users of the mesh network 102. In one embodiment, the client application 323 requests for a list of users on the mesh network 102 at step 370. The request may comprise, for example, network ID and app access token 240 of the client application 323. The management server 114 validates the permissions of the user of the client application 323 in providing the list of users at step 371. In one embodiment, the user management module 298 of the management server 114 verifies the user role of the client application 323 requesting for the list of users. On successful verification, the management server 114 forwards the list of users to the client application 323 at step 372.

The user of the client application 323 may select option to edit and remove user authorizations at step 373. On user selection, the client application 323 generates a request to connect to the mesh network 102 at step 374. On successful connection with the mesh network 102, the mesh network 102 transmits a SUCCESS message to the client application 323. In one embodiment, the gateway nodes 106 of the mesh network 102 transmits the SUCCESS message to the client application 323 at step 375. The user of the client application 323 may edit the role of the user and user authorizations such as including list of resources that may be accessible by the user at step 376, and transmits the request to update the edited user role and authorizations the management server 114 at step 377.

The management server 114 validates the permissions of the user of the client application 323 in editing the user authorizations made by the user of the client application 323 at step 378. In one embodiment, the user management module 298 of the management server 114 verifies the permission of the user of the client application 323 to make such a request. On successful validation, the management server 114 transmits an update request to the relay server 120 to update the edits in the user authorizations for users of third-party app at step 380. In one example, the update request may comprise network ID, network user ID, network user role, and resource access list. The relay server 120 then grants the edits in the user authorizations and approve the edits at step 380. In one example, the grant/approval may comprise network ID, network user ID, network user role, and resource access list. The gateway nodes 106 of the mesh network 102 receives the approval, updates the user resource authorizations and also updates the ACL 238 at step 381. Upon successful updation, the gateway nodes 106 transmits a SUCCESS message to the relay server 120 at step 382.

The gateway nodes 106 of the mesh network 102 may also use a clustering protocol to update the ACL 238 stored in other gateway nodes 106. The relay server 120 transmits a SUCCESS message to the management server 114 at step 383. The management server 114 updates the user authorization as part of the user data 287 at step 384 and transmits a SUCCESS message to the client application 323 at step 385 indicating the editing of the resource nodes 112 authorizations for the user.

Figure 3C:
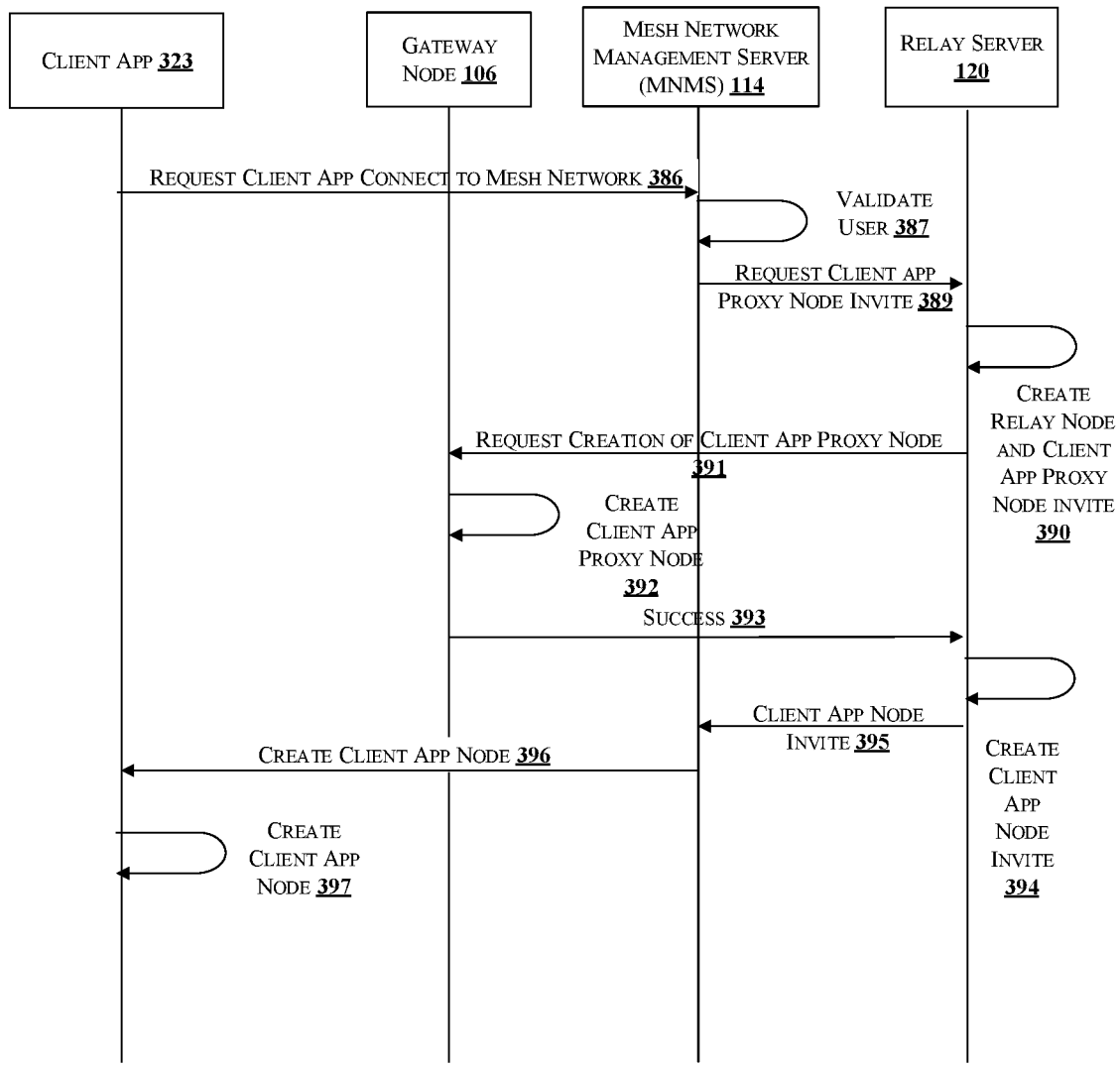
FIG. 3c illustrates an exemplary message sequence for enabling user of client application connecting to network in accordance with some embodiments of the present disclosure.

FIG. 3c illustrates an exemplary message sequence for enabling user of third-party app connecting to network in accordance with some embodiments of the present disclosure.

In an embodiment, the client device 118 having the client app 323 installed on the client device 118, may access the resource nodes 112 in the mesh network 102. To enable the access to the resource nodes 112, the client device 118 should join the mesh network 102. The user of the client device 118 may login into the client app 323, select the network to connect, and transmit a request to the management server 114 via the gateway nodes 106 requesting for client app connect to the mesh network 102 at step 386. The management server 114 receives the request for the client app 323 invite and validates the user making the request at step 387. The user management module 298 of the management server 114 access the user data 287 for validating the user making the request at step 387. On successful validation, the management server 114 generates a client app proxy node invite request to the relay server 120 at step 389. The client app proxy node invite request comprises network ID, user ID, user_role, app access list, resource access list, and the gateway node invite 239.

The relay server 120 receives the client app proxy node invite request to create the relay node 122, creates a relay node per user per app per network and creates the gateway node invite 239 at step 390. In one embodiment, the relay node creation module 264 creates the relay node 122 and the gateway node invite 239 and stores the relay node data 256. The relay server 120 forwards a request for creation of the client app proxy node for the client application 323 of the client device 118 to the gateway nodes 106 at step 391. In one embodiment, the request for creation of the client app proxy node comprises at least network ID, user ID, user_role, app ID, app access list, and resource access list, and the gateway node invite 239. The client app proxy node may be created for the client application 323 accessing the resource nodes 112. The gateway nodes 106 receive the invite for the gateway nodes 106 to create the client app proxy node from the relay server 120. The client app proxy node creation module 245 of the gateway nodes 106 creates the client app proxy node for the gateway nodes 106 at step 392 and transmits a SUCCESS message to the relay server 120 at step 393 indicating successful creation of the client app proxy node at the gateway nodes 106. The client app node invite creation module 268 of the relay server 120 creates an invite for the client app node of the client device 118 at step 394 and transmits the client app node invite at step 395 to the management server 114. The management server 114 forwards the client app node invite to the client device 118 at step 396. The user of the client application 323 creates the client app node for the client application 323 and uses the client app node invite to connect with the relay node 122 at step 397, thus enabling the client device 118 having the client application 323 joining the mesh network 102.

In one embodiment, the user of the client application 323 have permissions to add, delete the resource nodes 112, add and remove users of the third-party app and the client device 118, and install, un-install and re-install third-party app on the client device 118 using the NMM node.

Figure 4A:
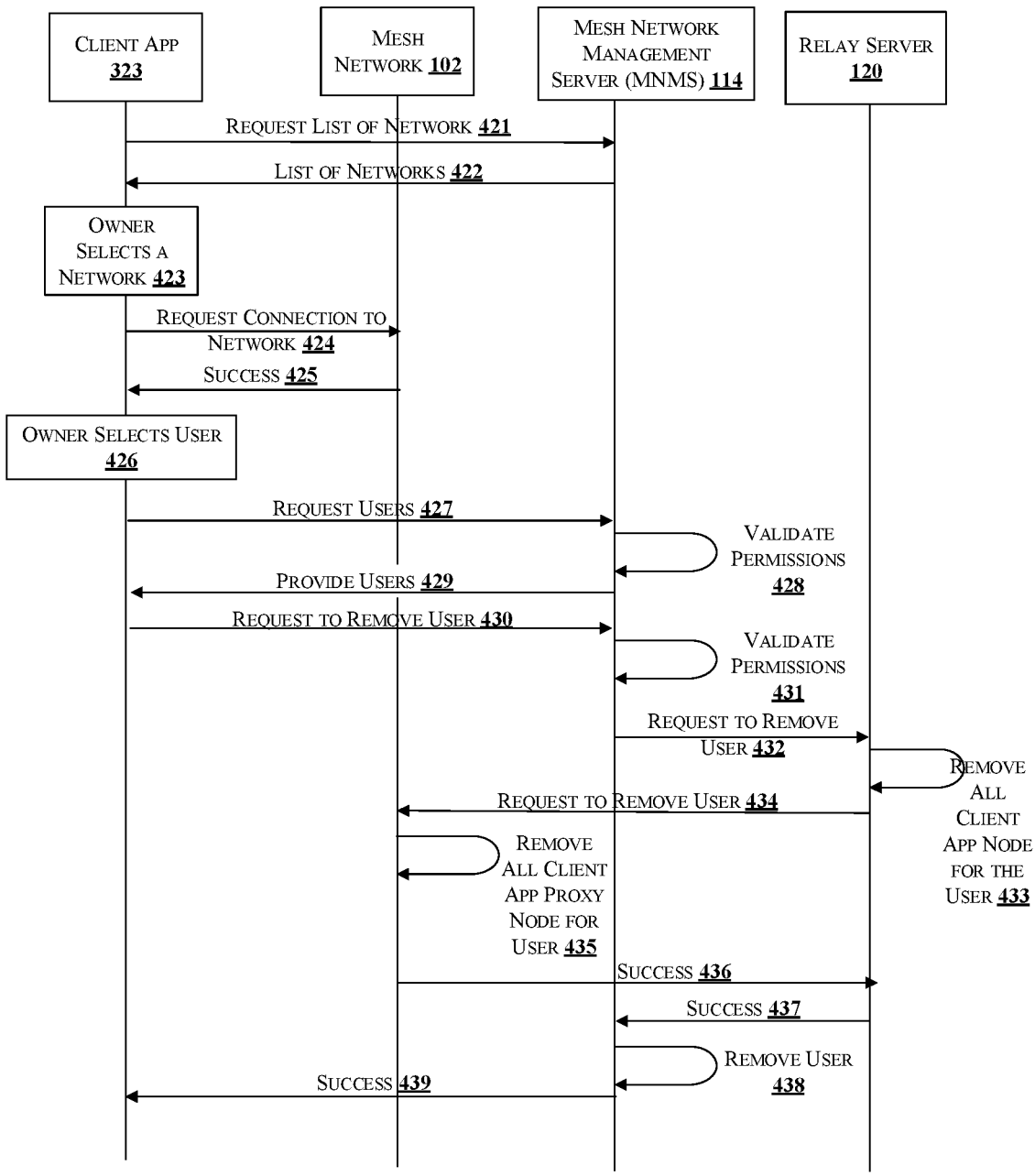
FIG. 4a illustrates an exemplary message sequence for removing user of client application from network in accordance with some embodiments of the present disclosure.

FIG. 4a illustrates an exemplary message sequence for removing user from the mesh network 102 in accordance with some embodiments of the present disclosure.

In one embodiment, the client application 323 requests for a list of the mesh network 102 at step 421. The request may comprise, for example, app access token of the client application 323. The management server 114 validates the permissions of the client application 323 in providing the list of the mesh network 102. In one embodiment, the user management module 298 of the management server 114 verifies the user role of the client application 323 requesting for the list of the mesh network 102. On successful verification, the management server 114 forwards the list of the mesh network 102 to the client application 323 at step 422.

The user of the client application 323 may select the mesh network 102 to edit at step 423. On user selection, the client application 323 generates a request to connect to the mesh network 102 at step 424. On successful connection with the mesh network 102, the mesh network 102 transmits a SUCCESS message to the client application 323. In one embodiment, the gateway nodes 106 of the mesh network 102 transmits the SUCCESS message to the client application 323 at step 425. The user of the client application 323 may selects user at step 426 and requests for a list of users in the selected mesh network 102 at step 427. The request may comprise, for example, app access token of the client application 323. The management server 114 validates the permissions of the client application 323 in providing the list of the users of the mesh network 102 at step 428. In one embodiment, the user management module 298 of the management server 114 verifies the user role of the client application 323 requesting for the list of the users of the mesh network 102. On successful verification, the management server 114 forwards the list of the users of the mesh network 102 to the client application 323 at step 429.

The client application 323 may transmit a request to remove user from the mesh network 102 at step 430. The request may comprise, for example, app access token of the client application 323. The management server 114 validates the permissions of the client application 323 removing the selected users of the mesh network 102 at step 431. In one embodiment, the user management module 298 of the management server 114 verifies the user role of the client application 323 requesting for removal of users of the mesh network 102. On successful verification, the management server 114 transmit the request for removal of user to the relay server 120 at step 432.

The user-app management module 267 of the relay server 120 removes all client app nodes created for the selected user at step 433 and transmits the request to remove the user to the mesh network 102 at step 434. The mesh network 102 receives the request to remove the user from the relay node 120 and removes all client app proxy node created for the same user at step 435. The gateway nodes 106 transmits a SUCCESS message to the relay node 120 upon successful removal of all the client app proxy node at step 436. Upon receiving the SUCCESS message, the relay node 120 transmits a SUCCESS message at step 437 to the management server 114. The management server 114 further proceeds to remove the user at step 438 and transmits a SUCCESS message to the client application 323 at step 439, thereby enabling removal of user from the mesh network 102.

Figure 4B:
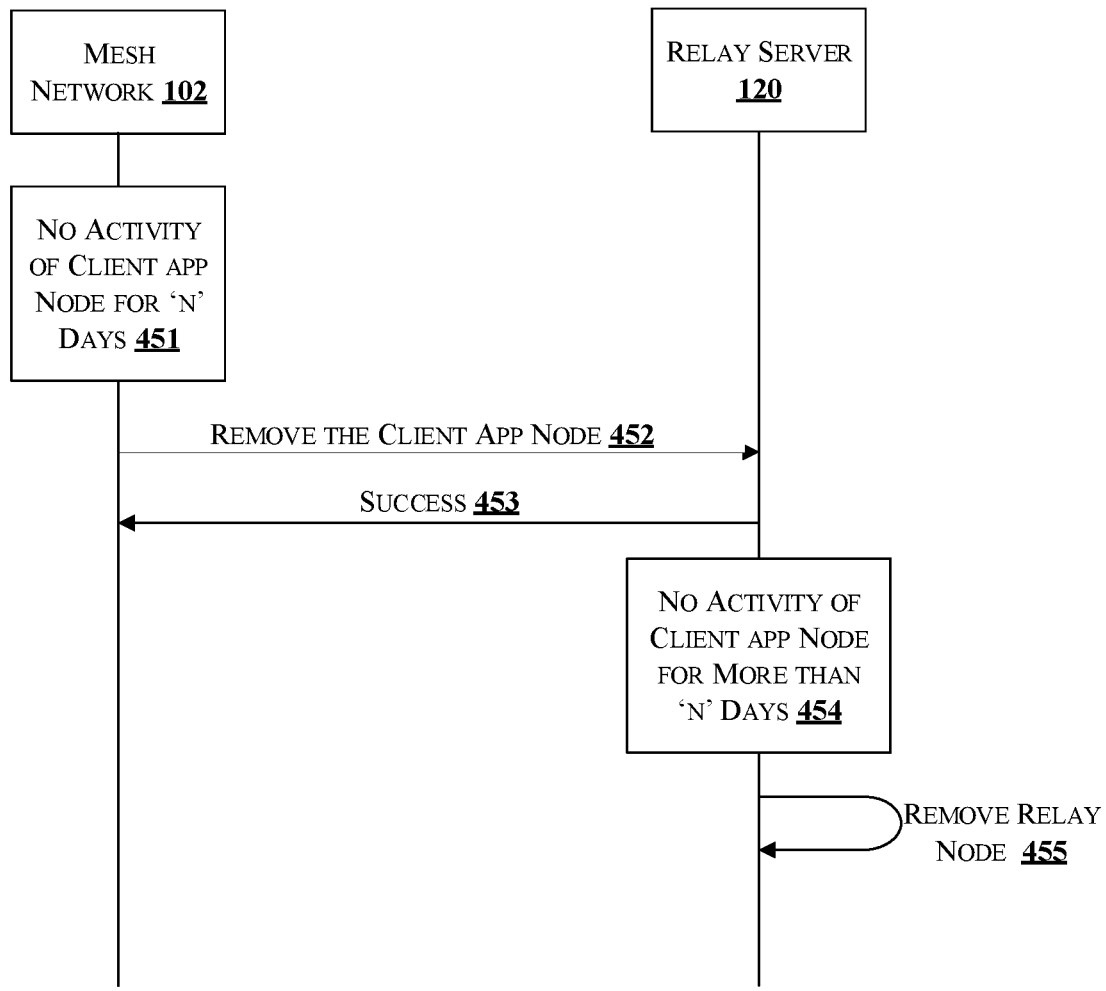
FIG. 4b illustrates an exemplary message sequence for uninstallation of client application from network in accordance with some embodiments of the present disclosure.

FIG. 4b illustrates an exemplary message sequence for uninstallation of client application from network in accordance with some embodiments of the present disclosure.

The mesh network 102 uninstalls the client application 323 of the client device 118 upon detection of absence of activity of the client application 323 for a predetermined time. In one embodiment, the gateway nodes 106 of the mesh network 102 determines no activity of the client app nodes for 'n' days at step 451. For example, 'n' may be 15 days. Based on the determination of absence of activity of the client app nodes, the gateway nodes 106 generates a request to unused remove the client app node and transmits the request to the relay server 120 at step 452. The request for removal of unused client app node may comprise at least the user ID and the client app ID. The relay server 120 transmits a SUCCESS message to the mesh network 102 at step 453 in response to receiving the request for removal of unused third-party app nodes.

In another embodiment, the relay server 120 may determine no activity of the client app node for more than 'n' days at step 454. Upon determination, the relay server 120 removes the relay node 122 for the corresponding client app node at step 455, thus enabling the uninstallation of the client app node from the mesh network 102.

Figure 4C:
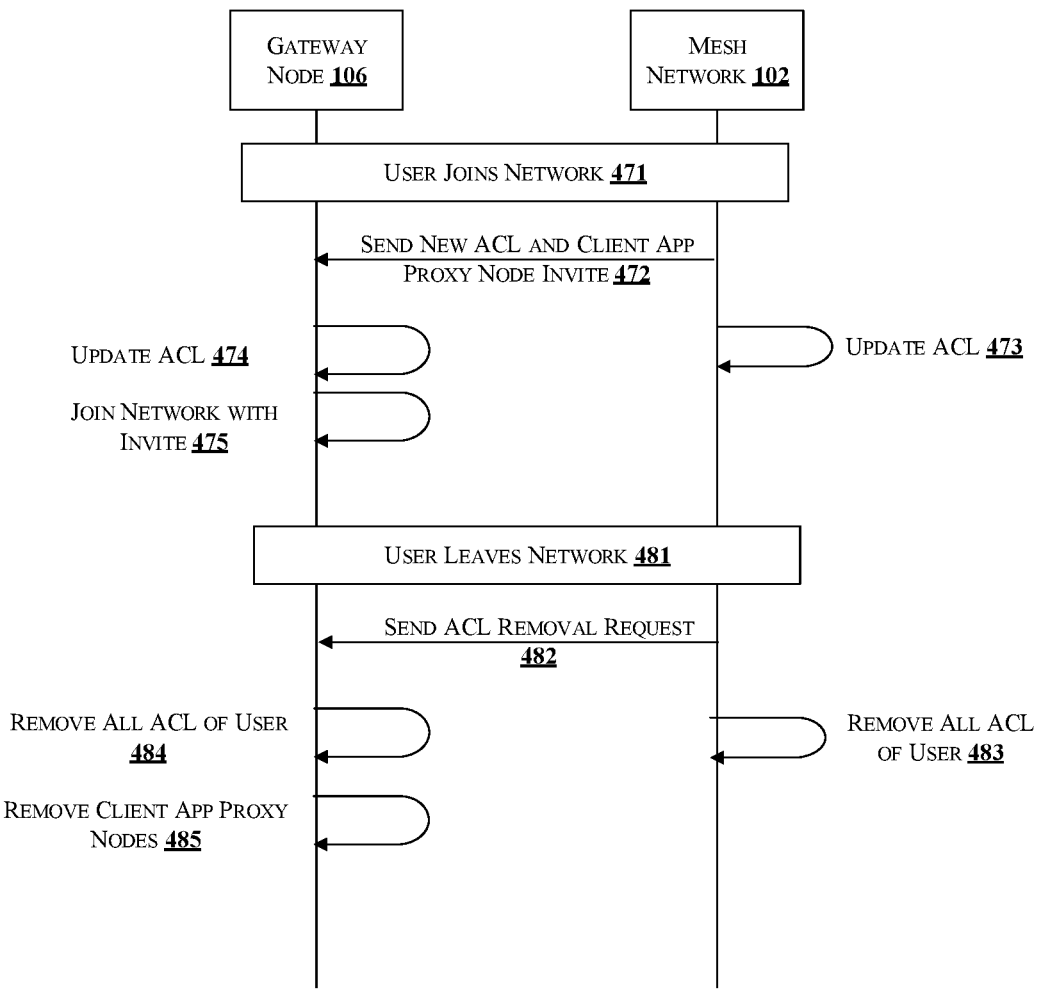
FIG. 4c illustrates an exemplary message sequence for managing access control list (ACL) of user from network in accordance with some embodiments of the present disclosure.

FIG. 4c illustrates an exemplary message sequence for managing access control list (ACL) of user from the mesh network 102 in accordance with some embodiments of the present disclosure.

In one embodiment, if the user joins the mesh network as illustrated in step 471, the gateway nodes 106 of the mesh network 102 transmits a request for addition of new ACL 238 and client app proxy node invite at step 472. The gateway nodes 106 in the mesh network 102 and the gateway node 106 that received the request for addition of new ACL continuously updates the ACL 238 as and when user permissions assigned to the user are updated by the gateway nodes 106 at steps 473 and 474. The gateway node 106 then enables the client app of the user to join the mesh network at step 475 based on the client app proxy node invite, thus enabling addition of ACL of user in the mesh network 102.

In another embodiment, if the user leaves the mesh network 102 as illustrated in step 481, the gateway nodes 106 of the mesh network 102 transmits a request for removal of the ACL 238 of the user at step 482. The gateway nodes 106 in the mesh network 102 and the gateway node 106 that received the request for removal of ACL removes the ACL 238 106 at steps 483 and 484. The gateway node 106 then removes the client app proxy nodes from the gateway nodes 106 at step 485, thus enabling removal of ACL of user from the mesh network 102.

Figure 5A:
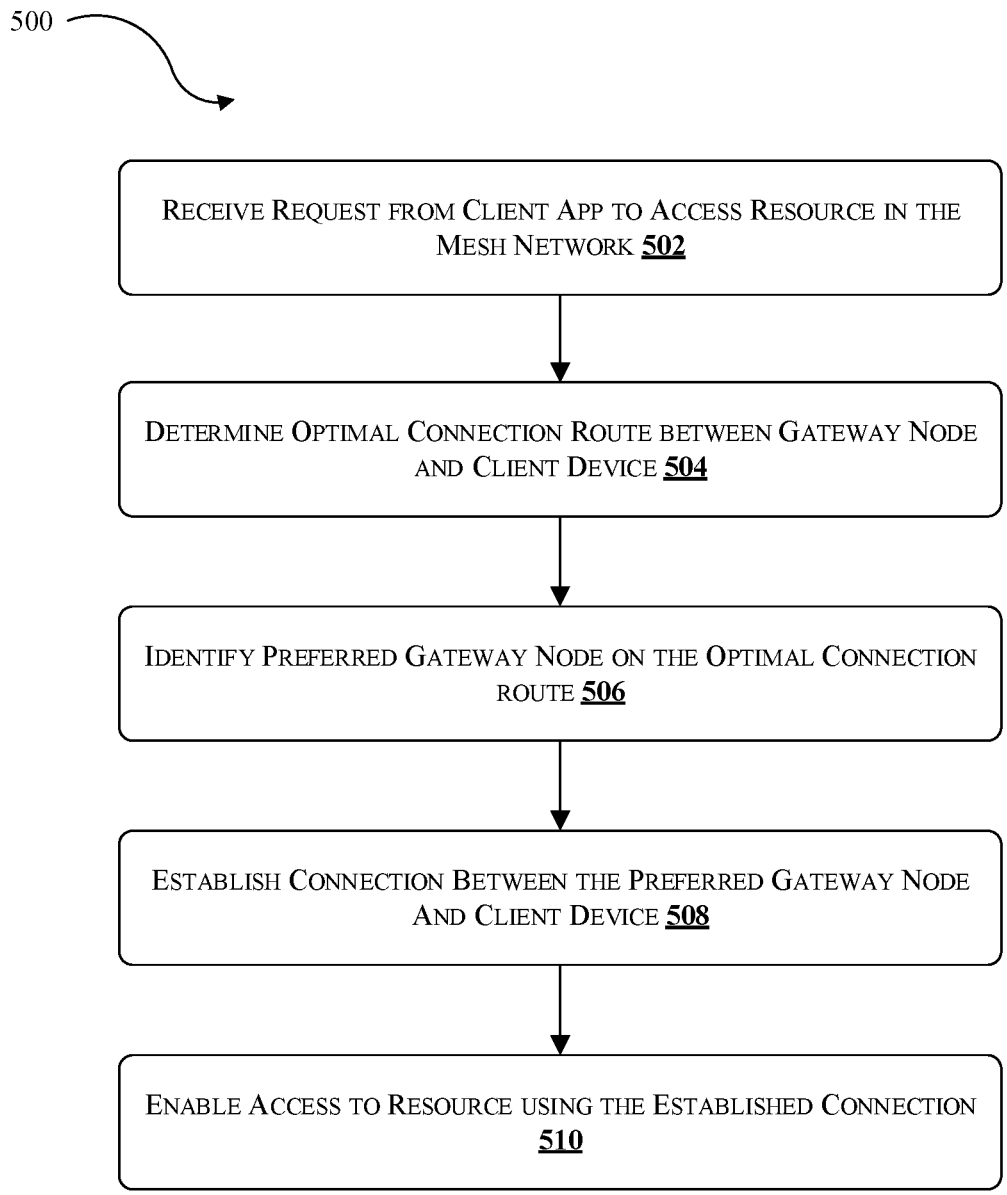
FIG. 5a illustrates an exemplary flowchart illustrating a method of managing decentralized access to a resource in a peer-to-peer network in accordance with some embodiments of the present disclosure.

FIG. 5a illustrates an exemplary flowchart illustrating a method of managing decentralized access to a resource in a peer-to-peer network in accordance with some embodiments of the present disclosure.

As illustrated in FIG. 5a, the method 500 includes one or more blocks implemented by the processor of the one or more nodes of the mesh network 102 for enabling decentralized access to the resource nodes 112. In one embodiment, the one or more blocks of the method 500 is performed by the processor 215 of the relay node 122, by the processor 231 of the gateway nodes 106, by the processor 282 of the management server 114, and by the client device 118. The method 500 may be described in the general context of computer executable instructions. Generally, computer executable instructions can include routines, programs, objects, components, data structures, procedures, modules, and functions, which perform particular functions or implement particular abstract data types.

The order in which the method 500 is described is not intended to be construed as a limitation, and any number of the described method blocks can be combined in any order to implement the method 500. Additionally, individual blocks may be deleted from the method 500 without departing from the scope of the subject matter described herein. Furthermore, the method 500 can be implemented in any suitable hardware, software, firmware, or combination thereof.

At block 502, the method includes receiving a request from a client app to access resources in the mesh network. In one embodiment, the relay node 120 receives a request for accessing one or more resources in the mesh network 102, from the client application 323 of the client device 118 associated with user. The mesh network 102 comprises one or more gateway nodes 106, and the one or more resources 112 connected to each of the one or more gateway nodes 106. Each of the gateway nodes 106 is a routing node configured to connect the client application 323 of the client device 118 with the access to one or more resources 112 of the mesh network 102. For example, the gateway node 106 is at least one of a physical gateway node, and a virtual gateway node.

At block 504, the method includes determining an optimal connection route between the at least one identified gateway node and the client device. In one embodiment, the processor 215 of the relay node 122 estimates an optimal route in the topology graph for the client device 118 to connect with the gateway nodes 106. In one example, the network topology of the client device 118 is one of first topology and second topology, wherein the first topology is a private network and the second topology is a public network. The processor 215 of the relay node 122 determines a topology graph based on the network topology of the client device 118. The topology graph for example, may comprise at least one route map for enabling the client device 118 to reach the resource nodes 112.

The processor 215 retrieves a topology graph that comprises a list of connection routes between the client device and the each of the one or more gateway nodes and determines the at least one optimal route in the topology graph for the client device to connect with the one or more gateway nodes. In one embodiment, the processor 215 determines the at least one optimal route in the topology graph based on one or more parameters including proximity and cost between the client device and the one or more gateway nodes 106. Based on optimal route thus estimated, the relay node 120 identifies at least one gateway node 106 for connecting with the client device 118.

At block 506, the method includes identifying the gateway nodes based on topology of the client device. In one embodiment, the relay node 122 identifies the gateway nodes 106 and upon identifying the preferred gateway node on the optimal connection route, the connection between the preferred gateway node and the client device 118 is established.

At block 508, the method includes establishing connection between the preferred gateway node and the client device. In one embodiment, to establish the optimal connection route, the relay node 122 exchanges dynamic IP addresses of the client device 118 and the gateway nodes 106 in the mesh network 102 to enable a peer-to-peer connection with the client device 118 and the gateway nodes 106 in the mesh network 102. In another embodiment, the relay node 122 is configured to establish a connection between the client device 118 and the gateway nodes 106 in the mesh network 102 via the relay node 122 if the peer-to-peer connection is not established.

At block 510, the method includes enabling access to the resource nodes using the established connection. In one embodiment, the processor 231 of the gateway nodes 106 retrieves the ACL 238 that comprises at least the application (app) access permissions allocated to the client app node of the corresponding client application 323 and a list of functions provided by the resource nodes 112 accessed by the client application 323 of the client device 118. The processor 231 maps the app access permissions allocated to the client app node with the list of functions of the resource nodes 112. On successful mapping, the processor 231 allow the client app node to avail the list of functions of the resource nodes 112 mapped with the application access permissions.

In another example, the user of the client application 323 may wish to obtain status information or modify the status of the resource nodes 112. The resource nodes 112 when accessed by the client application 323 on the client device 118 is capable of providing status information and receiving control commands to/from the client device 118 to modify the status of the resource nodes 112. Thus, the resource nodes 112 when accessed by the third-party app on the client device 118 provides status information and/or receive control commands to/from the client device 118 to modify the status of the resource nodes or the IoT device 112. Hence, enabling a secure, a mobility resilient, self-healing, plug and play network infrastructure for connecting applications, devices and services for the Internet of Everything (IoE) and allowing the secure a private, secure decentralized access to a resource in a peer-to-peer IP based mesh overlay network.

Figure 5B:
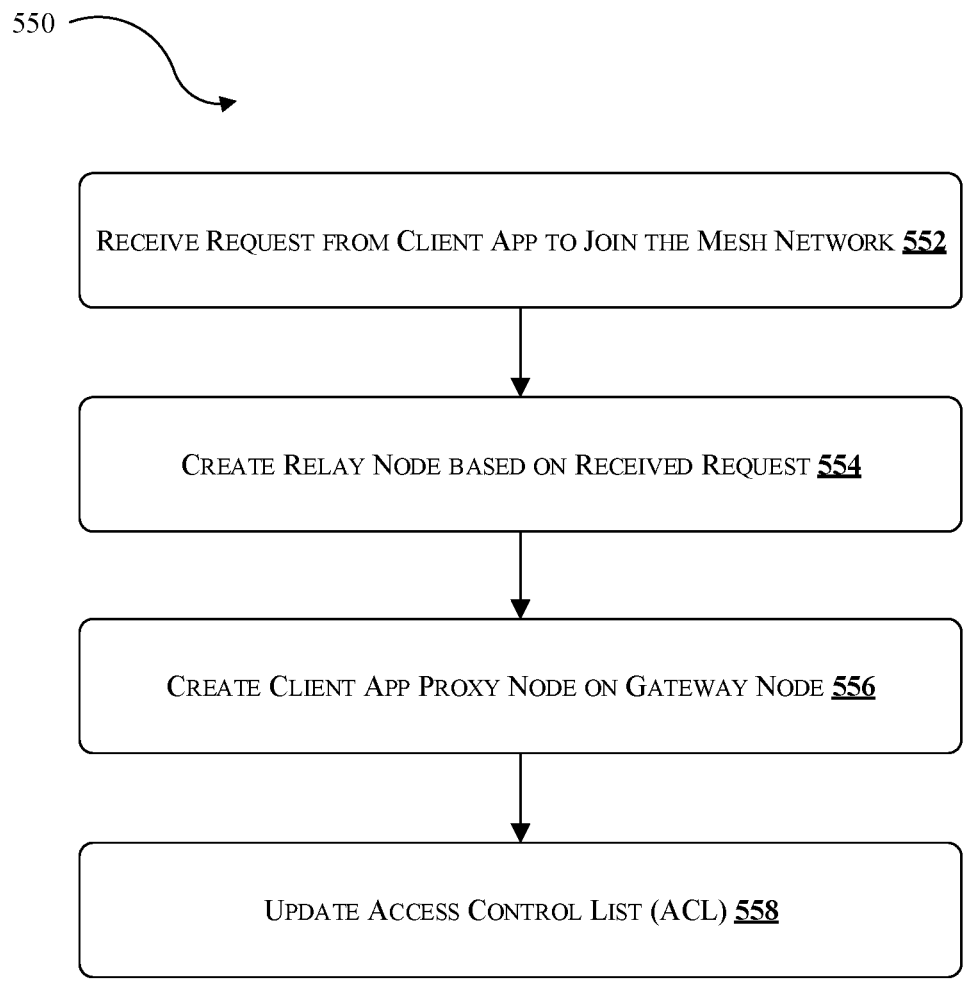
FIG. 5b illustrates an exemplary flowchart illustrating a method of creating a peer-to-peer mesh network that enables decentralized access to the resource in accordance with some embodiments of the present disclosure.

FIG. 5b illustrates an exemplary flowchart illustrating a method of creating a peer-to-peer mesh network that enables decentralized access to the resource in accordance with some embodiments of the present disclosure.

As illustrated in FIG. 5b, the method 550 includes one or more blocks implemented by the processor of the one or more nodes of the mesh network 102 for creating the mesh network 102 that enables the decentralized access to the resource nodes 112. In one embodiment, the one or more blocks of the method 550 is performed by the processor 215 of the relay node 122, by the processor 231 of the gateway nodes 106 and by the client device 118. The method 550 may be described in the general context of computer executable instructions. Generally, computer executable instructions can include routines, programs, objects, components, data structures, procedures, modules, and functions, which perform particular functions or implement particular abstract data types.

The order in which the method 550 is described is not intended to be construed as a limitation, and any number of the described method blocks can be combined in any order to implement the method 550. Additionally, individual blocks may be deleted from the method 550 without departing from the scope of the subject matter described herein. Furthermore, the method 550 can be implemented in any suitable hardware, software, firmware, or combination thereof.

At block 552, the method includes receiving a request from client app to join a mesh network. In one embodiment, the client app installed on the client device 118 generates a request to join the mesh network 102 so as to access the resource nodes 112 in the mesh network 102. In one embodiment, the user of the client device 118 may login into the client application 323, select the network to connect, and transmit a request to the management server 114 via the gateway nodes 106 requesting for a client app invite. The management server 114 receives the request for the client app invite and validates the user on the network making the request. The user management module 298 of the management server 114 access the user data 287 for validating the user making the request. On successful validation, the management server 114 generates a client app invite request to the relay server 120. The client app invite request comprises network ID, user ID, user role, app access list, resource access list, and the gateway node invite 239. In another example, the request may comprise at least the network ID of the mesh network 102 and app access token 240 of the client application 323 wishing to join the mesh network 102 identified by the network ID.

At block 554, the method includes creating a relay node based on received request from third-party app. In an embodiment, the relay server 120 receives the invite to create the relay node 122 and creates a relay node per user per app per network and creates the gateway node invite 239. In one embodiment, the relay node creation module 264 creates the relay node 122 and the gateway node invite 239 and stores the relay node data 256.

At block 556, the method includes creating a client app proxy node based on received gateway node invite. In an embodiment, the relay server 120 forwards a request for creation of the client app node for the third-party app of the client device 118 to the gateway nodes 106. In one embodiment, the request for creation of the client app node comprises at least network ID, user ID, user_role, app ID, app access list, and resource access list, and the gateway node invite 239. The client app node may be created for the client application 323 accessing the resource nodes 112. The gateway nodes 106 receive the invite for the gateway nodes 106 to create the app node from the relay server 120. The client app proxy node creation module 245 of the gateway nodes 106 creates a client app proxy node for the gateway nodes 106 and transmits a SUCCESS message to the relay server 120 indicating successful creation of the client app proxy node at the gateway nodes 106. The client app node invite creation module 268 of the relay server 120 creates an invite for the client app node of the client device 118 and transmits the invite of the relay node for the client app of the client device 118 to the management server 114. The management server 114 forwards the invite of the relay node to the client device 118. The client application 323 of the client device 118 creates a client app node for the client application 323 of the client device 118 and uses the invite to connect with the relay node 122, thus enabling the client device 118 having the client application 323 joining the mesh network 102.

At block 558, the method includes updating ACL. In one embodiment, the processor 231 of the gateway nodes 106 updates the ACL 238 comprising list of the resource nodes 112, the gateway nodes 106, client app node, and list of functions offered by the resource nodes 112, and application access permissions allocated to the client app node for corresponding resource nodes 112. The gateway nodes 106 stores a copy of the ACL 238 and instance of each resource node 112 is coupled to the at least one gateway nodes 106 in the mesh network 102.

The mesh network 102 is further configured by adding at least one new resource node 112 to the mesh network 102 for the gateway nodes 106. Each resource node 112 is provided with a resource_ID. The mesh network 102 also updates the ACL 238 with the at least one new resource node 112 and list of functions provided by the at least one new resource node 112. Thus, the disclosure enables a peer-to-peer mesh network infrastructure that allows secure access to the resource by a third-party application without using a cloud server to route the resource access request from the client device to the gateway.

Figure 6:
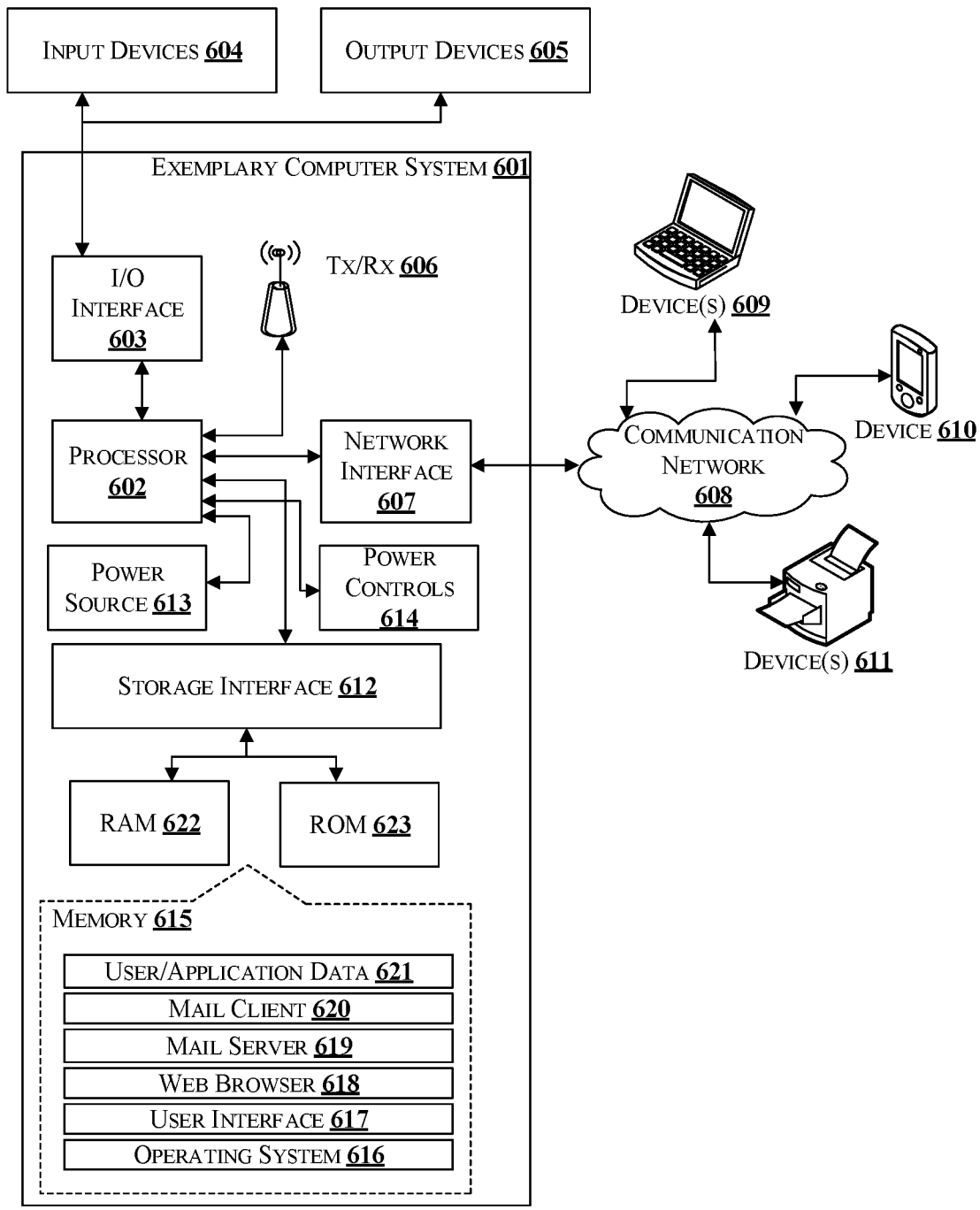
FIG. 6 is a block diagram of an exemplary computer system for implementing embodiments consistent with the present disclosure.

FIG. 6 is a block diagram of an exemplary computer system for implementing embodiments consistent with the present disclosure.

Variations of computer system 601 may be used for implementing all the computing systems that may be utilized to implement the features of the present disclosure. Computer system 601 may comprise a central processing unit ("CPU" or "processor") 602. Processor 602 may comprise at least one data processor for executing program components for executing user- or system-generated requests. The processor may include specialized processing units such as integrated system (bus) controllers, memory management control units, floating point units, graphics processing units, digital signal processing units, etc. The processor 602 may include a microprocessor, such as AMD Athlon, Duron or Opteron, ARM's application, embedded or secure processors, IBM PowerPC, Intel's Core, Itanium, Xeon, Celeron or other line of processors, etc. The processor 602 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 602 may be disposed in communication with one or more input/output (I/O) devices via I/O interface 603. The I/O interface 603 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 605 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 602 may be disposed in communication with a communication network 608 via a network interface 607. The network interface 607 may communicate with the communication network 608. The network interface 607 may employ connection protocols including, without limitation, direct connect, Ethernet (e.g., twisted pair 10/40/400 Base T), transmission control protocol/internet protocol (TCP/IP), token ring, IEEE 802.11a/b/g/n/x, etc. The communication network 608 may include, without limitation, a direct interconnection, local area network (LAN), wide area network (WAN), wireless network (e.g., using Wireless Application Protocol), the Internet, etc. Using the network interface 607 and the communication network 608, the computer system 601 may communicate with devices 609, 610, and 611. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 601 may itself embody one or more of these devices.

In some embodiments, the processor 602 may be disposed in communication with one or more memory devices (e.g., RAM 613, ROM 6Error! Reference source not found.14, etc.) via a storage interface 612. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory 615 may store a collection of program or database components, including, without limitation, an operating system 6Error! Reference source not found.16, user interface application 6Error! Reference source not found.17, web browser 618, mail server 619, mail client 620, user/application data 621 (e.g., any data variables or data records discussed in this disclosure), etc. The operating system 616 may facilitate resource management and operation of the computer system 601. Examples of operating systems include, without limitation, Apple Macintosh OS X, UNIX, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface application 617 may facilitate display, execution, interaction, manipulation, or operation of program components through textual or graphical facilities. For example, user interfaces may provide computer interaction interface elements on a display system operatively connected to the computer system 601, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 601 may implement the web browser 618 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 601 may implement a mail server 619 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 601 may implement a mail client 620 stored program component. The mail client may be a mail viewing application, such as Apple Mail, Microsoft Entourage, Microsoft Outlook, Mozilla Thunderbird, etc.

In some embodiments, computer system 601 may store user/application data 621, such as the data, variables, records, etc. as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method of managing a decentralized access to a resource in an IP-based mesh overlay network of one or more nodes, method comprising:

receiving, by a relay node, a request, for accessing one or more resources in the mesh overlay network, from a client application of a client device associated with user, wherein the mesh overlay network that comprises one or more gateway nodes, and the one or more resources connected to each of the one or more gateway nodes;

determining, by the relay node, at least one optimal connection route between the client device and each of the one or more gateway nodes of the mesh overlay network based on network topology of the client device;

identifying, by the relay node, at least one preferred gateway node based on the at least one optimal connection route thus determined; and establishing, by the relay node, a connection, between the client device and the at least one identified gateway node, to enable the client application to access the one or more resources connected with the at least one identified gateway node;

receiving, by a relay server, a request for connecting a relay node with the one or more gateway nodes, wherein the request comprises at least network ID, user ID, user role, client application ID, an application access list and a resource access list;

generating, by the relay server, the relay node for the client application for the network ID and user ID, and a gateway node invite for connecting the one or more gateway nodes with the relay node;

receiving, by the relay server, a confirmation message indicative of successful creation of a client app proxy node at the one or more gateway nodes created upon receiving the gateway node invite; and generating, by the relay server, a client app node invite for enabling the client application to join the mesh overlay network on receiving the confirmation message.

2. The method as claimed in claim 1, wherein determining the at least one optimal connection route comprising steps of:

retrieving, by the relay node, a topology graph that comprises a list of connection routes between the client device and the each of the one or more gateway nodes; and determining, by the relay node, the at least one optimal route in the topology graph for the client device to connect with the one or more gateway nodes based on one or more parameters including proximity and cost between the client device and the one or more gateway nodes; and.

providing a list of preferred gateway nodes associated with the at least one optimal route thus determined.

3. The method as claimed in claim 1, wherein the at least one gateway node is a routing node configured to connect the third-party app of the client device with the one or more resources of the mesh overlay network, wherein the gateway node is at least one of a physical gateway node, and a virtual gateway node.

4. The method as claimed in claim 1, wherein the relay node is provided with a static Internet Protocol (IP) address and is configured to exchange dynamic IP addresses of the client device and the at least one identified gateway node therebetween to establish a peer-to-peer connection between the client device and the at least one gateway node in the mesh overlay network.

5. The method as claimed in claim 1, wherein the relay node is configured to establish a connection between the client device and the at least one identified gateway node in the mesh overlay network through the relay node if the peer-to-peer connection is not established.

6. The method as claimed in claim 1, wherein enabling accessing of the one or more resources in the mesh overlay network by:

mapping a plurality of application access permissions allocated to the client application with a list of functions provided by the one or more resources; and allowing the client application to avail the list of functions mapping with the application access permissions.

7. The method as claimed in claim 1, further comprising removing at least one user from the mesh overlay network, by:

receiving, by the relay server, a request to remove at least one user from the mesh overlay network, wherein the request comprises at least network ID and the user ID associated with the user to be removed;

deleting, by the relay server, one or more client app nodes on the relay server corresponding to the user having user ID and for the mesh overlay network having network ID;

transmitting, by the relay server, a request to remove all client app nodes and client app proxy nodes for the user having the user ID and for the mesh overlay network having network ID; and transmitting, by the relay server, a confirmation message to the MNMS to delete the user from the mesh overlay network.

8. The method as claimed in claim 1, further comprising uninstalling the client application from the mesh overlay network, by:

receiving, by the relay server, a request for uninstalling one or more client applications from the mesh overlay network, wherein the request comprises at least the user ID and the client application ID;

verifying, by the relay server, the request based on determination of inactive time period of the one or more client applications in the mesh overlay network; and removing, by the relay server, the relay node corresponding to the one or more client applications based on determination.

9. A system for managing a decentralized access to a resource in an IP-based mesh overlay network of one or more nodes, system comprising:

a relay node, comprising at least a processor, and a memory communicatively coupled to the processor, wherein the memory stores processor-executable instructions, which, on execution, cause the processor to:

receive a request, for accessing one or more resources in the mesh overlay network, from a client application of a client device associated with user, wherein the mesh overlay network that comprises one or more gateway nodes, and the one or more resources connected to each of the one or more gateway nodes;

determine at least one optimal connection route between the client device and each of the one or more gateway nodes of the mesh overlay network based on network topology of the client device;

identify at least one preferred gateway node based on the at least one optimal connection route thus determined; and establish a connection, between the client device and the at least one identified gateway node, to enable the client application to access the one or more resources connected with the at least one identified gateway node.

10. The system as claimed in claim 9, wherein relay node determines the at least one optimal connection route by steps of:

retrieving a topology graph that comprises a list of connection routes between the client device and the each of the one or more gateway nodes; and determining the at least one optimal route in the topology graph for the client device to connect with the one or more gateway nodes based on one or more parameters including proximity and cost between the client device and the one or more gateway nodes; and providing a list of preferred gateway nodes associated with the at least one optimal route thus determined.

11. The system as claimed in claim 9, wherein the at least one gateway node is a routing node configured to connect the third-party app of the client device with the one or more resources of the mesh overlay network, wherein the gateway node is at least one of a physical gateway node, and a virtual gateway node.

12. The system as claimed in claim 9, wherein the relay node is provided with a static Internet Protocol (IP) address and is configured to exchange dynamic IP addresses of the client device and the at least one identified gateway node therebetween to establish a peer-to-peer connection between the client device and the at least one gateway node in the mesh overlay network.

13. The system as claimed in claim 9, wherein the relay node is configured to establish a connection between the client device and the at least one identified gateway node in the mesh overlay network through the relay node if the peer-to-peer connection is not established.

14. The system as claimed in claim 9, wherein the relay node enables accessing of the one or more resources in the mesh overlay network by:

mapping a plurality of application access permissions allocated to the client application with a list of functions provided by the one or more resources; and allowing the client application to avail the list of functions mapping with the application access permissions.

15. The system as claimed in claim 9, further comprising:

a relay server, comprising at least a processor, and a memory communicatively coupled to the processor, wherein the memory stores processor-executable instructions, which, on execution, cause the processor to:

receive a request for connecting a relay node with the one or more gateway nodes, wherein the request comprises at least network ID, user ID, user role, client application ID, an application access list and a resource access list;

generate the relay node for the client application for the network ID and user ID, and a gateway node invite for connecting the one or more gateway nodes with the relay node;

receive a confirmation message indicative of successful creation of a client app proxy node at the one or more gateway nodes created upon receiving the gateway node invite; and generate a client app node invite for enabling the client application to join the mesh overlay network on receiving the confirmation message.

16. The system as claimed in claim 15, wherein the relay server is further configured to remove at least one user from the mesh overlay network, by:

receiving a request to remove at least one user from the mesh overlay network, wherein the request comprises at least network ID and the user ID associated with the user to be removed;

deleting one or more client app nodes on the relay server corresponding to the user having user ID and for the mesh overlay network having network ID;

transmitting a request to remove all client app nodes and client app proxy nodes for the user having the user ID and for the mesh overlay network having network ID; and transmitting a confirmation message to the MNMS to delete the user from the mesh overlay network.

17. The system as claimed in claim 15, wherein the relay server is further configured to uninstall the client application from the mesh overlay network, by receiving a request for uninstalling one or more client applications from the mesh overlay network, wherein the request comprises at least the user ID and the client application ID;

verifying the request based on determination of inactive time period of the one or more client applications in the mesh overlay network; and removing the relay node corresponding to the one or more client applications based on determination.

* * * * *